United States Patent [19]

Osborne et al.

[11] Patent Number: 5,327,247
[45] Date of Patent: Jul. 5, 1994

[54] COMPENSATION OF LOSSES AND DEFECTS IN TELECINE DEVICES

[75] Inventors: Trevor M. Osborne, Stevenage; Terrence W. Mead; Stuart Hunt, both of Hertford, all of United Kingdom

[73] Assignee: Rank Cintel Ltd., United Kingdom

[21] Appl. No.: 720,449

[22] PCT Filed: Dec. 22, 1989

[86] PCT No.: PCT/GB89/01539

§ 371 Date: Jun. 24, 1991

§ 102(e) Date: Jun. 24, 1991

[87] PCT Pub. No.: WO90/07842

PCT Pub. Date: Jul. 12, 1990

[30] Foreign Application Priority Data

Dec. 23, 1988 [GB] United Kingdom ............... 8830205
Jun. 16, 1989 [GB] United Kingdom ............... 8913924

[51] Int. Cl.⁵ ..................... H04N 3/36; H04N 5/253
[52] U.S. Cl. .................................. 348/100; 348/251
[58] Field of Search ............... 358/214, 216, 215, 217, 358/220, 54

[56] References Cited

U.S. PATENT DOCUMENTS

| | | | |
|---|---|---|---|
| 3,663,750 | 5/1972 | Besier | 178/7.2 |
| 3,743,772 | 7/1973 | Pieters et al. | 178/7.2 |
| 3,821,468 | 6/1974 | Busch | 178/6.8 |
| 3,902,011 | 8/1975 | Pieters et al. | 178/7.2 |
| 3,919,473 | 11/1975 | Cotter | 178/7.2 |
| 3,949,162 | 4/1976 | Malueg | 178/7.1 |
| 4,032,975 | 6/1977 | Malueg et al. | 358/213 |
| 4,218,711 | 8/1980 | Kashigi | 358/183 |
| 4,227,215 | 10/1980 | Gurley | 358/160 |
| 4,314,281 | 2/1982 | Wiggins | 358/280 |
| 4,343,021 | 8/1982 | Frame | 358/213 |
| 4,472,740 | 9/1984 | Doi | 358/209 |
| 4,570,181 | 2/1986 | Yamamura | 358/160 |
| 4,772,941 | 9/1988 | Noble | 358/76 |
| 4,780,755 | 10/1988 | Knierim | 358/10 |

FOREIGN PATENT DOCUMENTS

| | | | |
|---|---|---|---|
| 264726 | 4/1988 | European Pat. Off. | H04N 5/262 |
| 57-65057 | 4/1982 | Japan | H04N 1/00 |
| 61-129978 | 10/1986 | Japan | H04N 5/228 |
| 62-31119 | 7/1987 | Japan | H01L 21/30 |
| 271454 | 4/1957 | United Kingdom | H04N 3/26 |
| 771509 | 4/1957 | United Kingdom | H04N 3/26 |
| 2074416 | 10/1981 | United Kingdom | H04N 3/00 |
| 2115640 | 9/1983 | United Kingdom | H04N 3/30 |
| 2149260 | 6/1985 | United Kingdom | H04N 5/14 |
| 2195855 | 4/1988 | United Kingdom | H04N 5/33 |

OTHER PUBLICATIONS

The use of Test Films For Television by Stirling-Bksts Journal May 1986 --pp. 230-237.

(List continued on next page.)

*Primary Examiner*—Joseph Mancuso
*Assistant Examiner*—Tuan V. Ho
*Attorney, Agent, or Firm*—Ostrolenk, Faber, Gerb & Soffen

[57] ABSTRACT

A signal produced by a telecine suffers from losses and defects caused by differences in response to incident light between different areas of the screen area scanned. These differences may arise from burning of the screen, blemishes, dirt in the system, differences in grain size of phosphor particles, missing particles, and losses in the internal optical system of the machine. The invention divides the scanning area into a correction map and devises for each area a correction factor based on the response of that area to incident illumination. When a defect is detected, video data from an adjacent area is substituted. Correction factors are held in a look-up RAM and output to a multiplier where they are multiplied with video data. The video data input to the multiplier may be suppressed and a test pattern may be loaded into the multiplier. Burn at the ends of video lines may be reduced by reducing the intensity and/or dwell time of the scanning spot on any one area of the screen in the vicinity of the line end.

38 Claims, 13 Drawing Sheets

OTHER PUBLICATIONS

IBM Technical Disclosure Bulletin –vol. 29, No. 8 Jan. 1987.

A 1MB Field Memory for TV Picture by Nakagawa et al. –IEEE 1987 –pp. 319–322.

A Review of the Semiconductor Storage of Television Signals –by Riley –BBC RD May 1987 –pp. 1–20.

BBC Research Department Report; BBC RD Mar. 1985; I. Childs, Sections 2.3.4.2.

Meod, T. W. and Childs, Ian, "Scratch and Dirt Concealment within a CCD–Based Telecine". IBC 84, pp. 246–250.

Storey, Richard, "Electronic Detection and Concealment of Film Dirt", S.M.P.T.E. Jul. 94 (1985) Jun., No. 6, pp. 642–647.

Childs, Ian, "Further Development of CCD line array Telecine" BBC Research Dept. Mar. 1985, pp. 15–24.

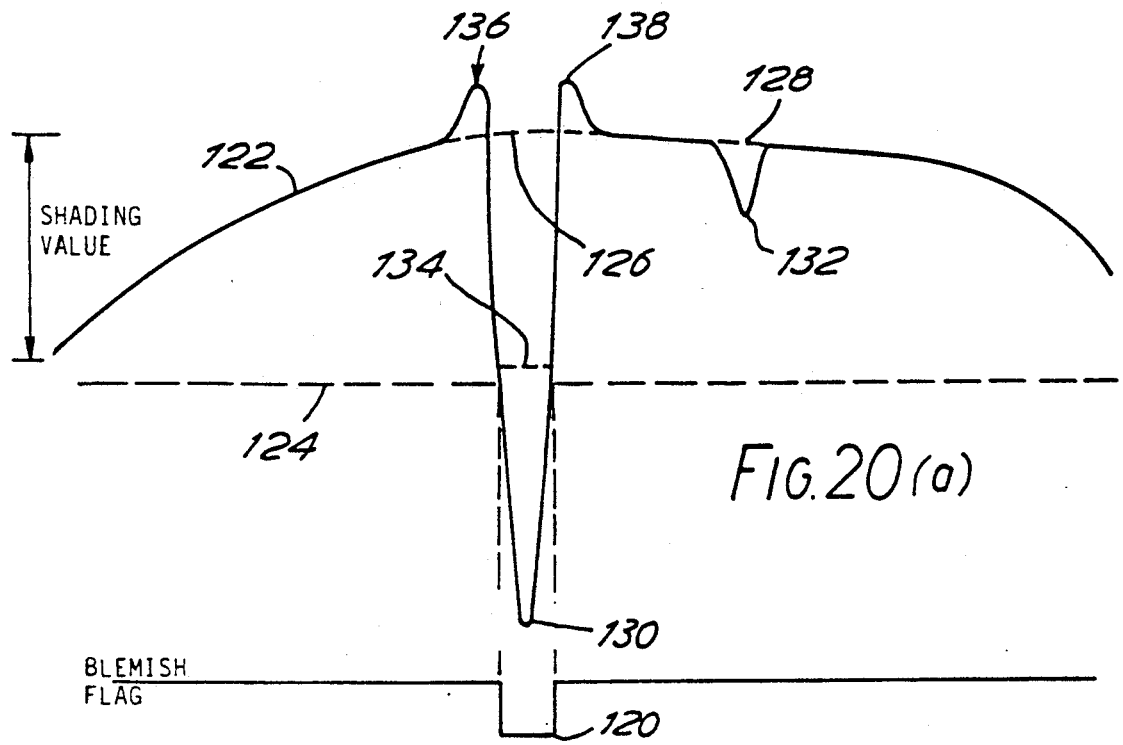
FIG. 20(a)
FIG. 20(b)
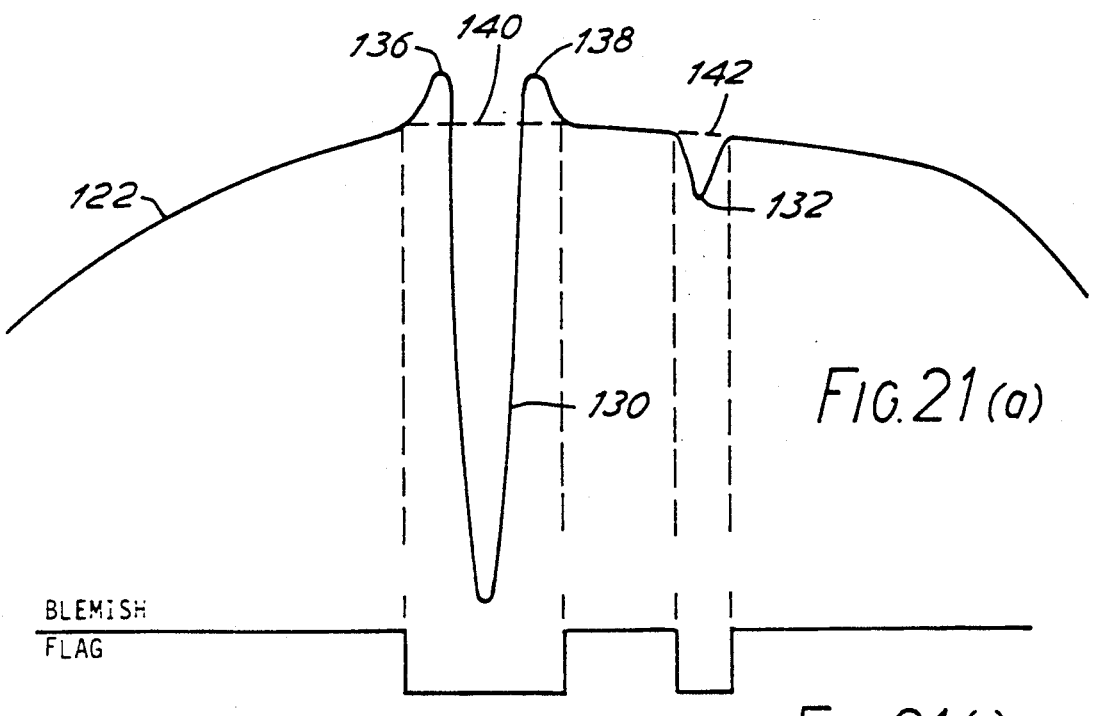
FIG. 21(a)
FIG. 21(b)

SCANNED IMAGE

DISPLAYED IMAGE

SHADING BOARD CORRECTION MAPS
(DIRECT-LOADED WITH EFFECTS DATA)

RED

GREEN

BLUE

COMPENSATION OF LOSSES AND DEFECTS IN TELECINE DEVICES

FIELD OF THE INVENTION

This invention relates to telecine machines and in particular to the correction of shading burn, blemish and dirt errors. The invention is also applicable to film writers; that is, telecine machines which are operated to write from an input video signal.

BACKGROUND AA

Attempts have been made to minimise errors caused by deficiencies in the Cathode Ray Tube (CRT) or Photo-Multiplier Tube (PMT). Shading correction has been used on TV cameras and telecine for many years and has generally taken the form of a set of waveforms which are predefined or adjusted to be the reciprocal of the shading error, these waveforms being multiplied by (in the case of linear signals), or added to (for logarithmic signals) the uncorrected video signals to produce signals which are substantially free from shading errors.

This method of correction is satisfactory for smooth and symmetrical errors such as may be caused by non-uniform lens transmission characteristics. However, errors caused by variations in efficiency of the phosphor layer in CRTs are not consistent and require the combination of adjustable proportions of many different waveforms to achieve a satisfactory correction. The same considerations are true for variations in cathode sensitivity of PMTs and graduations of colour filters. Consequently, to obtain satisfactory correction, a large number of controls requiring a complex alignment is necessary. Even then it is not possible to correct isolated patches on the picture.

Another type of error is known as burn. Burn errors are those caused by the scan spending a longer time at some locations on the CRT face than at others. The result is localised solarisation of the glass or staining of the phosphor which results in distinct steps in the light output at those locations. Burn errors cannot be corrected by the type of shading corrector described above since they generally display a series of sharp edges. It has been proposed to use a separate burn corrector which uses an additional PMT which looks directly at the CRT face to measure the burn errors, and then calculates the reciprocal of the error waveform, before multiplying it together with the video waveforms to produce corrected video waveforms.

This proposed method has not proved wholly satisfactory as it has the disadvantage that non-uniformities in the burn correction optical path or due to burn PMT sensitivity variations (which may be very significant) will be applied to the video signal, resulting in a more difficult task for the shading corrector.

A further source of errors are blemishes and dirt. Blemishes are small sharply focused spots of no light output from the CRT which are caused by missing particles of phosphor or debris on the phosphor surface. Dirt on the CRT faceplate will also appear as dark spots.

Neither of these errors can be corrected by the shading corrector outlined above. However, one or other of the dirt or blemish errors can be corrected using the burn corrector described. Both errors cannot be corrected at once as the burn PMT is off the optical axis and thus gives parallax errors so that when adjusted to correct for blemishes it produces a correction for dirt at the wrong picture location. Fitting the burn PMT on the optical axis is undesirable as a mirror system would have to be used involving a consequent loss of light and deterioration in the telecine signal to noise ratio.

Another source of errors is the phosphor grains themselves. The granular structure of the CRT phosphor results in random variations in the light output which are of small size and amplitude. These errors cannot be corrected by the shading corrector described above but can be improved by the burn corrector when adjusted to minimise blemishes.

Various methods have been proposed for compensating for variations in response in telecine and television cameras. BBC Research report BBC RD 1985/3 discloses a system which compensates for variations in sensitivity in individual elements of a line array CCD sensor. This is known as a "stripe stripper" and operates by measuring the response of each element of the 1024 element line array. In effect, the system multiplies the output of each element by a correction factor derived for that element to give a substantially uniform output across the array and to eliminate the vertical stripes which result from variations in response across the array.

GB 2149260 (Marconi) discloses another CCD compensation system. The principle is similar to the proposal of BBC RD 1985/3 but applied to area array CCDs. Thus, a correction factor is derived for each element of array.

GB 2074416 (Ampex) relates to television cameras and divides an active video picture into a 13 block 14 band ratio. In a setup mode the signal from a selected camera is sent to an A/D converter in the video signal path. Horizontal and vertical error measurements are made in which selected samples within blocks of successive horizontal lines and bands of vertical lines are summed to provide horizontal and digital data which are then subtracted from the measured output of each block or band to derive a correction factor.

None of the above proposals considers how to compensate for the type of defects which arise in flying spot telecine. Furthermore, the two documents which compensate for variations in sensitivity of individual CCD elements do not consider how to compensate for other defects which arise in the optical path, for example uneven film illumination.

SUMMARY OF THE INVENTION

The present invention aims to provide a system which provides compensation for the type of errors which arise in flying spot telecine systems as described above.

The invention in its various aspects is defined in the claims to which reference now should be made.

Existing flying spot telecines require frequent and complex alignment. One feature of the present invention is a method and apparatus that enables a self-alignment operation to be performed whenever requested. Self-alignment is an automatic process carried out by the telecine in which it derives correction factors and, where appropriate, blemish signals for the whole scanning area and applies these derived values to output video data. Individual stored corrections are given for all pixels in the picture area and these corrections applied to the video signal during normal operation.

In a preferred embodiment the system uses a digital scan generator which maps a CRT raster into a 1024×1024 digital correction address map. A linear scan drive circuit ensures that any digital scan address corresponds to a precise and consistent position on the CRT face. Each of the 1,048,576 mapping points has a corresponding 16 bit memory location in which is stored the appropriate shading correction value.

During the self-alignment process each of these locations is measured under no-film conditions and the uncorrected video is preferably integrated over a period of time whilst the scanning spot is moved around within its mapping pixel area. The latter techniques have the advantage of reducing the effects of random noise and fine CRT grain which would otherwise be locked in as a fixed pattern. The integrated video measurements are then converted into shading correction values.

During normal operation the video signals are multiplied by the current scan pixel correction value using a digital multiplier, the input video being a 14 bit digital signal. In one preferred embodiment a separate and self contained circuit is provided for each of the red, green and blue video channels.

The high resolution 1024×1024 map has the advantage that irregular shading patterns can be corrected, even small area changes and fairly sharp edges such as burn errors. Similarly CRT grain, and to some extent blemishes and dirt, may be corrected.

Another feature of the invention further reduces the effects of burn. We have appreciated that the task of the shading corrector on burn edges may be facilitated by spreading out the edge of the raster so that it does not burn a sharp edge on the phosphor.

In one embodiment of the invention slow edges on the CRT blanking waveforms will spread the burn edges in a similar fashion. In another embodiment a similar effect can be achieved by accelerating the scan waveform at the blanking edge times. Alternatively or additionally, the scanning spot may be defocused at the blanking edge times. The three techniques of burn reduction may be combined together.

In a further feature of the invention a constant checking is performed during the alignment process to detect any scan pixel containing video levels below the correctable level. Any such pixel has its memory location flagged to indicate that it contains a blemish or dirt. During normal operation any location so flagged will be treated as invalid video data and will be substituted by the immediately previous video data.

A further aspect of the invention uses the video correction factor storage area for inserting test patterns into the video path. The storage area is temporarily loaded with the test pattern instead of the correction data and the video input is forced to unity level so that the output of the multiplier is the test signal. The test pattern originates from a separate processor system where it may reside in ROM or be generated from a suitable set of algorithms.

In another aspect of the invention, a high speed random access memory is produced by a multiplexing technique in which a plurality of identical banks of fast RAM, e.g. four banks, are each loaded with identical data and are read by a four phase clock which thereby permits a read data rate four times greater than that possible with a single block of RAM. Whilst this system uses four times as much RAM it is nevertheless cheaper than using a single block of faster RAM. This technique increases effective RAM operating speeds whilst maintaining true random access.

In a further embodiment of the invention, special effects may be produced. This may be achieved by generating digital horizontal and vertical scan addresses, continuously comparing the address with predetermined reference addresses delineating the border of the active picture, applying a blanking signal when the scan address exceeds the limits of the active picture defined by the reference addresses and modifying the reference addresses to introduce blank areas into the active picture.

Special effects may also be produced by generation of a brightness map which may be loading into the correction factor memory in place of, or in addition to, the stored correction factors. The brightness map can be selected to create a desired picture shading, for example, an optical vignette.

Alternately, the brightness factors, in combination with the correction factors may be used to compensate for irregularities in the film used, for example, differences in response across the film. A clear film is inserted in the gate after the correction factors have been derived and a set of brightness factors derived which compensate for losses caused by the film. The brightness factors are combined with the correction factors to produce a set of compensation factors which are then applied to the video data.

Rather than deriving the brightness factors from clear film a set of factors may be preloaded by the operator, for example, to correspond to a slope of a given gradient across the width of the film, or to a parabola. The preloaded curve may be determined from known characteristics of the film, or batch of film being used.

BRIEF DESCRIPTION OF THE DRAWINGS

An embodiment of the invention will now be described in detail by way of example and with reference to the accompanying drawings, in which:

FIGS. 20(a) and (b) show respectively a sample trace of shading intensity and the blemish flag;

FIGS. 21(a) and (b) are similar to FIGS. 20(a) and (b) for a modified blemish concealment method;

DETAILED DESCRIPTION OF THE EMBODIMENT

Figure 1:
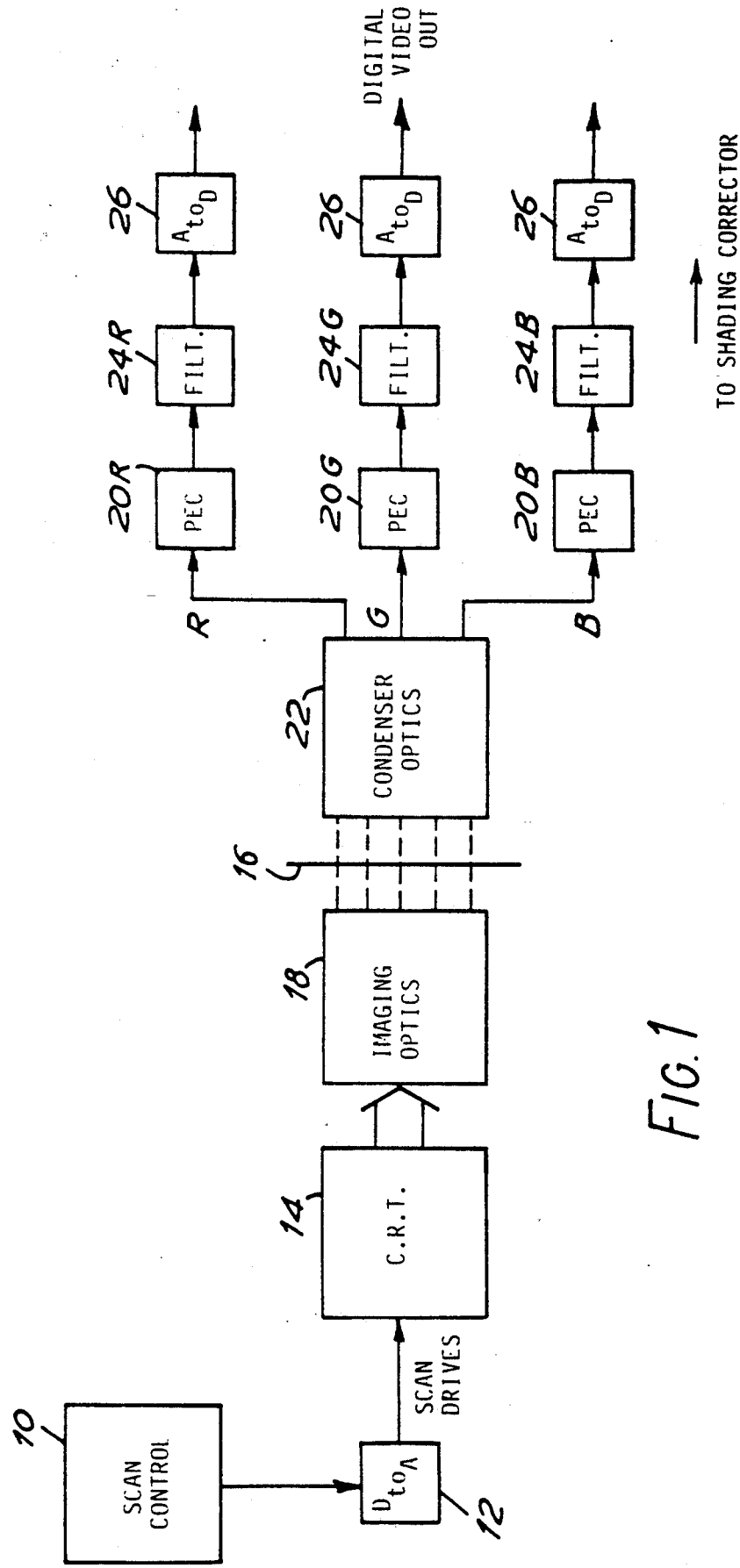
FIG. 1-is a schematic representation of the image scanning path of a telecine embodying the invention.

In the embodiment illustrated in FIG. 1, a digital scan controller 10 produces a pattern of x;y coordinate data that is converted to an analogue signal by D to A converter 12. The analogue signal forms the input to CRT 14 and controls the traverse of the illuminating electron beam over the face of the CRT. Light from the CRT passes through the image film 16 via an optical system 18 and then to three photo-electric cells 20R, 20G and 20B, one for each primary colour, via a second optical system 22. The second optical system 22 includes a beam splitter (not shown) for dividing the light from the CRT into the three individual components. Each of the photo-electric cells (PECs) 20R, G, and B produces an individual analogue signal proportional to the amount of light that falls on it. These signals are filtered through filters 24R, G, B. and digitised by analogue to digital converters 26 to form three separate digital output signals.

In practice, the RGB digital output signals are not true representations of the image on the films as they suffer from a number of effects that are characteristic of the analogue/optical portion of the scanning path and which contribute towards a substantially degraded output.

Shading is the primary degrading effect and is a global variation in image intensity caused, primarily, by a fall off in illumination intensity towards the edges of the CRT, and also by edge cut off in the first and second optics 18, 22 (FIG. 1). The transmission characteristics of the various dichroic mirrors and filters used in the colour splitting stages 22 and 24 also affect the shading. The dichroic mirrors exhibit variations in performance as a function of the angle of incident light, whereas the filters display non-uniformity of transmission across their surfaces. The photo-electric cells 20 also display a non-uniform response across their surfaces.

The factors mentioned above can cause variations in tube intensity of up to 50% in a random profile from edge to edge across the screen. Shading has a different effect on each colour channel, partly due to the CRT 14 and partly due to the dichroic elements of the second optics system 22. Non-uniformity of transmission is a particular problem with blue filters.

Burn effects caused by the scanning spot damaging the CRT face also give rise to global intensity variations. The effect is inherently random in nature and can contribute to a further 20% loss of illumination intensity. Colour dependence is largely in terms of burn amplitude rather than profile.

Variations in illumination intensity caused by variations in size and orientation of phosphor grains on the CRT face are comparatively minor compared to shading and burn losses, but nevertheless can account for variations in intensity of around 1%.

Blemishes are exhibited as pixel-scale errors, introduced when the scan pattern encounters a defect in the phosphor surface of the CRT. The amplitude of the effect is usually severe, giving up to 100% loss of illumination. Because of the severity of the effect, tube specifications go a long way to reducing blemish problems.

Dirt on the CRT face can produce a blemish-like effect although the affected areas are, more diffuse in nature and spread over a wider area. Dirt can, of course, occur at any point along the optical path described but is a particularly severe problem on the CRT face causing losses of up to 100%, similar to blemishes.

Figure 2:
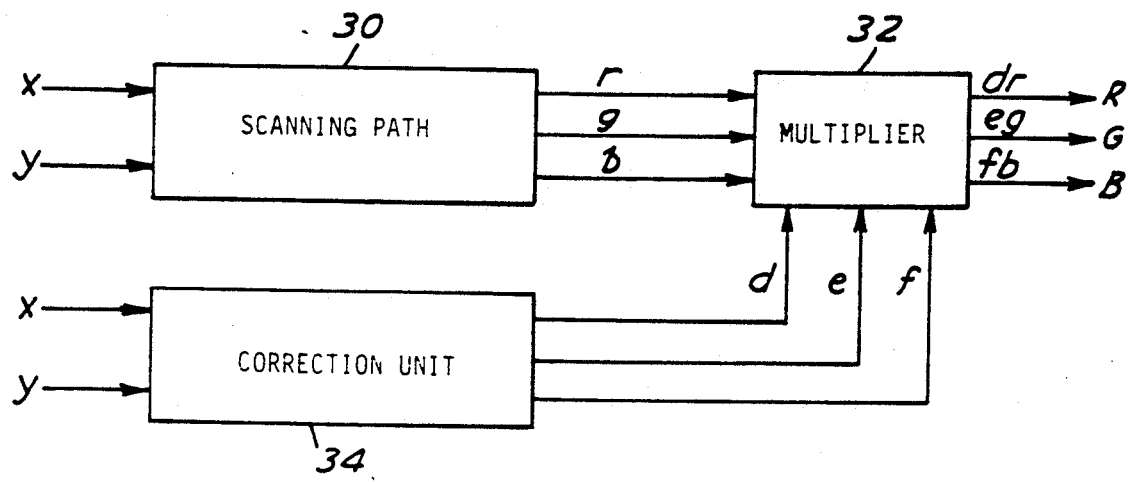
FIG. 2-shows the basic concept of video signal correction.

Referring to FIG. 2, the system embodying the invention provides an automatic shading unit which corrects all the above mentioned effects which cause degradation of illumination intensity and which requires no manual setting up or adjustment.

The general approach of the system is to calculate and apply a separate correction factor to each colour component. This is necessary as the random variations in perceived image intensity are, to a degree, colour dependent. Thus, in FIG. 2, the scanning path circuitry illustrated in FIG. 1 is illustrated generally at 30 and produces digital r, g, b outputs. These outputs are fed to a multiplier 32 which multiplies each input by an individual correction factor d, e, f to produce outputs dr, eg, fb which are corrected colour signals R, G, B. The correction factors d, e, f are produced by a correction unit 34 which will now be described in more detail.

For scanning purposes the working area of the CRT is represented as a map, each point of which is addressable by conventional X, Y coordinates. The working area is that area of the screen which is imaged through the film gate and is a square of dimensions approximately equivalent to 1,000 TV lines. The coordinate system takes the centre of the working area as the origin (...0,...0).

Scan resolution is 14 bits along each axis, which gives an 8192 by 8192 bit grid (8K by 8K). As the intensity variations due to shading, burn, grain effects, blemishes and dirt are essentially random in nature, it is convenient for the correction factor to be derived from a stored mapping of the image area made in the open-gate (no film) condition.

The same degree of accuracy for defect mapping as scan resolution is not required. The scan resolution could generate a map having 64M points which would be much greater than necessary. Satisfactory results can be obtained from a 10 bit resolution (1024×1024) giving 1M mapping points. Resolution below this level could degrade performance with regard to the burn and grain aspects of shading defects which vary much more rapidly in spatial terms.

Figure 3:
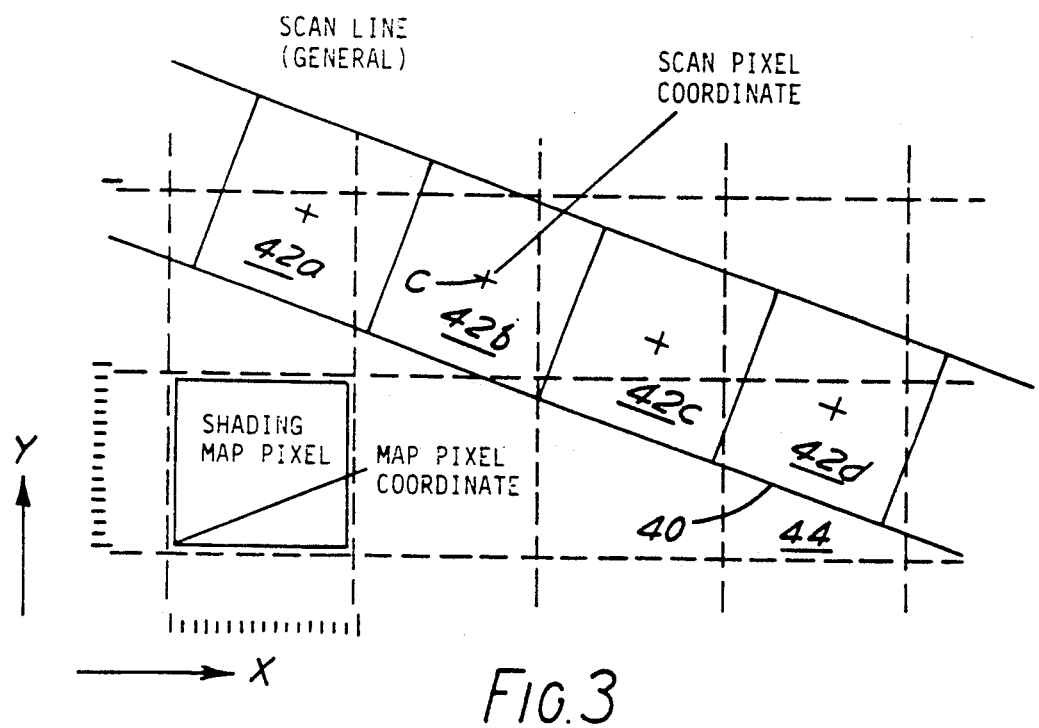
FIG. 3-shows a section of the working area of the CRT screen divided into a scan map and a shading map.

The shading map is partially illustrated in FIG. 3. The same coordinate system as the scanning map is used, (but at a lower resolution). The pixels of the shading map are conveniently arranged to be bounded by the major ordinates of the higher resolution scan grid.

It will be seen from FIG. 3 that each shading map pixel contains a 16×16 scanning grid. Thus, the shading map coordinates can be derived from the scanning coordinates simply by truncating the last four (least significant) bits of the scan coordinates. It should be noted that under this system the address of the pixel in the shading map corresponds to the scan grid point at its bottom left corner, not its centre.

Variable geometry scan patterns are employed to produce more complicated effects than the conventional X-Y zoom and pan, e.g. image rotation and perspective distortion. Therefore the direction of scanning will not, in general, be orthogonal to the axes as shown by the unbroken scanning lines in FIG. 3.

A scan line is generated by a scan controller addressing a sequence of coordinate points, each point defining the centre c of a scan pixel 42. The constraints of tube resolution mean that scan and map pixels may be considered of similar size, although there is no common orientation or pixel registration.

The mapped shading correction applied to any scan pixel will be that stored against the map pixel which encloses its (centre) coordinate, i.e. the map pixel addressed by the truncated form of the scan address. As may be seen from FIG. 3, most scan pixels will, in general, fall into several map pixels. However, the selected map pixel will always contain the largest single "area segment" of the scan pixel. Given the relatively small change in shading value over one or two pixels there is no need to interpolate values between adjacent map pixels and this method of addressing is perfectly adequate. Thus in FIG. 3, scan pixels 42a, 42b and 42c are corrected according to data stored against the first three shading map pixels of the upper of the two rows of shading map pixels illustrated, whereas, corrections applied to the further scan map pixel 42d are derived from the fourth shading map pixel of the lower of the two rows (pixel 44).

Blemishes in the tube face, and small dirt particles present a different problem. The relatively small size of the blemished area, in relation to scan line width, means that only scan lines passing very close to, or directly over, a blemish are affected.

Adequate mapping of these effects would require a much higher resolution than that adopted for shading; probably the full 14 bit resolution. As indicated, such resolution is not feasible.

Figure 4:
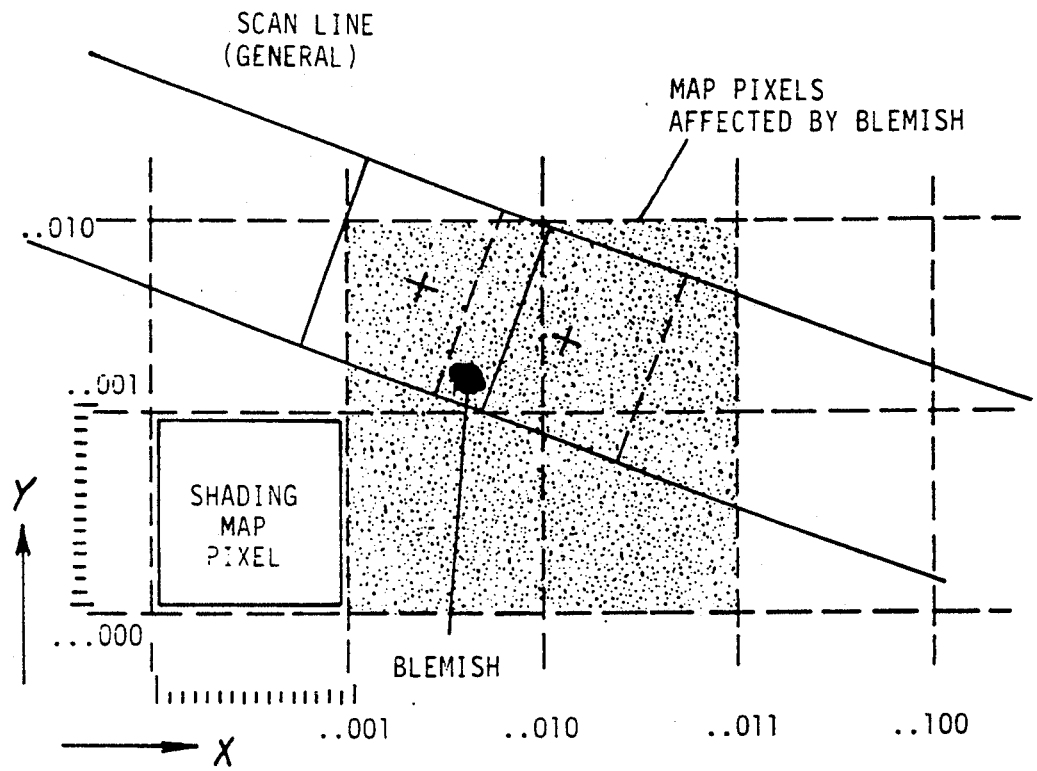
FIG. 4-illustrates the effect of a blemish on the shading map.

The problems may be overcome by flagging any shading map pixel that encloses a scanning coordinate affected by a blemish. Referring to FIG. 4, the shading map pixel having the coordinates (. . . 001. . . . 001) encloses a scanning pixel coordinate, which pixel contains a blemish. The map pixel is therefore marked as blemished.

This technique allows even the smallest blemish to be represented by a low resolution pattern of map pixels. If a scan pixel falls on one of the indicated map pixels it is processed for blemish correction rather than shading as will be described later. A consequence of this simplification mechanism is that blemish processing will, in some cases, be applied to scan pixels not actually affected by a blemish. However, a hard-switched "blemish correction off" facility is provided for use if e.g. spurious blemish correction degrades pictures containing a lot of small detail.

The corrective factors applied by the correction unit 34 are performed on the video data for each pixel of the scanned image. As mentioned previously, a separate correction factor is derived for each of the three colour channels to neutralise the effects of colour-dependence in the defects. Alternatively, correction factors may be derived for the luminance (Y) and colour difference (i.e. R-Y and B-Y) components of a conventional video signal.

The shading correcting factors are derived as follows:

The A-D coverter 26 at the output of the scan path provides a 14 bit binary signal scaled from 0000 to 3FFF (Hex). It is assumed that 0000 corresponds to (peak) "black", and 3FFF represents peak "white". The video level obtained from each scan pixel is multiplied by a correction factor (CF) before being passed to subsequent stages of the system, such that:

VIDEO OUT=CF×VIDEO IN

Correction factors are derived from the video output with an open gate, and are calculated to give the maximum possible output when multiplied through, that is, with no film in position. Each pixel of the shading map has its own, individually calculated CF.

The correction requirement is defined, for a given pixel as VOG×CF=VMAX where:
VMAX=maximum A-D output, and
VOG=video level−(open gate); thus,
the correction factor CF=VMAX/VOG
VMAX may be obtained from a measurement of the peak value for each pixel with suitable gain added.

In practice, VOG is first calculated as an average value for each map pixel, obtained over 64 separate scan passes, so that temporal averaging will reduce the effects of noise and glitches on CF. The individual samples are also distributed spatially within the bounds of the map pixel, again for averaging purposes, and to give better area coverage for picking up small blemishes. Obviously it is highly undesirable to "correct" a video signal using an erroneous correction factor generated from a noise spike.

The range of CF is restricted such that shading correction is normally only applied to those pixels producing an average open gate output at least equal to 30% of VMAX. Where this threshold is not achieved, the pixel is assumed to be blemished, a blemish correction is applied as will be described. A CF value is still calculated in this case, for use if blemish processing is turned off, but it is clipped at a maximum value of 3.99.

Next, the blemish corrections are applied. When a video signal originates from a pixel identified as blemished, no multiplicative correction is applied. Instead, the most recent "unblemished" VIDEO OUT value is repeated. (Neither VIDEO IN or CF can be relied upon 100%, depending upon how badly the pixel is affected by the blemish and the alignment of the scan line).

Blemishes are identified by either of two criteria. The first of these is a 30% threshold of VMAX (as previously described). The second is a lower absolute blemish threshold in which a blemish is assumed if any of the 64 values of VOG obtained from a pixel during the averaging process is less than the threshold value-(VMBLEM), value. The second qualifying criteria is necessary to pick up shading map pixels on the edge of blemishes which may not be sufficiently affected overall to fail the average level test. VBLEM is set sufficiently below the 30% threshold to avoid spurious blemish indications being given by noise on the video signal.

If the blemish processing mechanism is turned off, the shading correction factor CF is again applied to each pixel.

Figure 5:
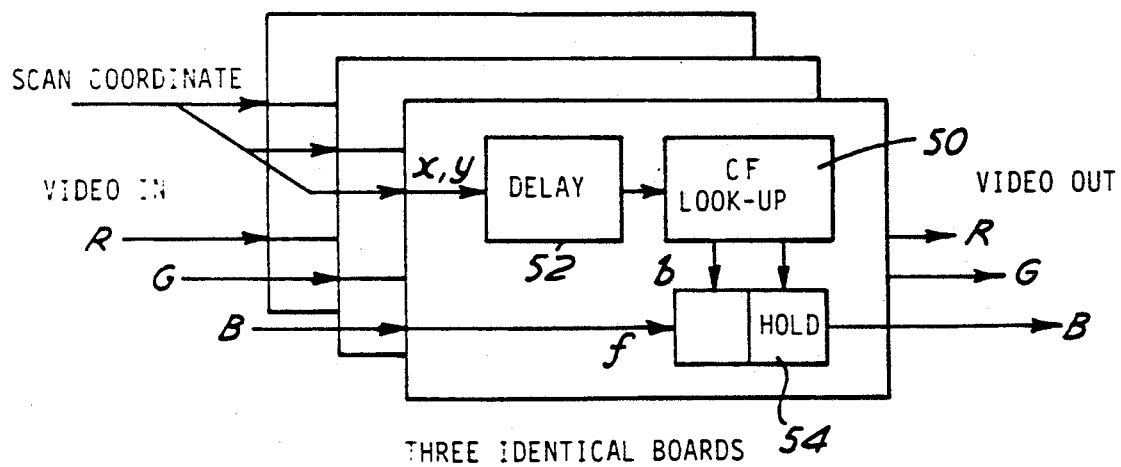
FIG. 5-is a block diagram showing how the shading error correcting factors are applied to each colour signal.

FIG. 5 illustrates, schematically, the hardware required to process an incoming video signal to apply the correction factor CF and blemish correction to each pixel. A separate circuit is used for each colour channel or each video signal component.

The incoming scan coordinate x, y is used as a memory address to a look-up table 50 of stored CF values which provides one input to the video multiplier 32 (FIG. 2) at d, e or f.

As mentioned previously, the the CF value is derived in the open gate condition. The address to the look up table 50 is delayed in a delay 52 in order to give the correct matching between scan coordinate and video pixel so that each pixel is multiplied by the correct CF. The delay is equal to differences in propagation time through the scanning path 30 of FIG. 2 and correction or shading unit 34.

The look up table 50 has two outputs, the output 54 corresponding to the multiplier 32 in FIG. 2 and a second output to a hold circuit 56. The hold 56 prevents the output from the multiplier when a blemish is indicated and instead substitutes the value of the most recent blemish-free output.

The correct functioning of the look-up table depends on it being correctly set up. The table must be aligned at various intervals; when the machine is first turned on and at other times thereafter as desired. During the alignment process the correction or auto shading unit 34 operates to derive the correction factors as previously explained. The circuitry necessary for the derivation will now be described.

The alignment process comprises two stages: video sampling and correction factor generation. During the sampling stage an average value of VOG is derived for each pixel, and each pixel is checked for blemishes. In the second stage, the actual correction factors are calculated, based on the data obtained from sampling. This latter calculation is as previously described.

Figure 6:
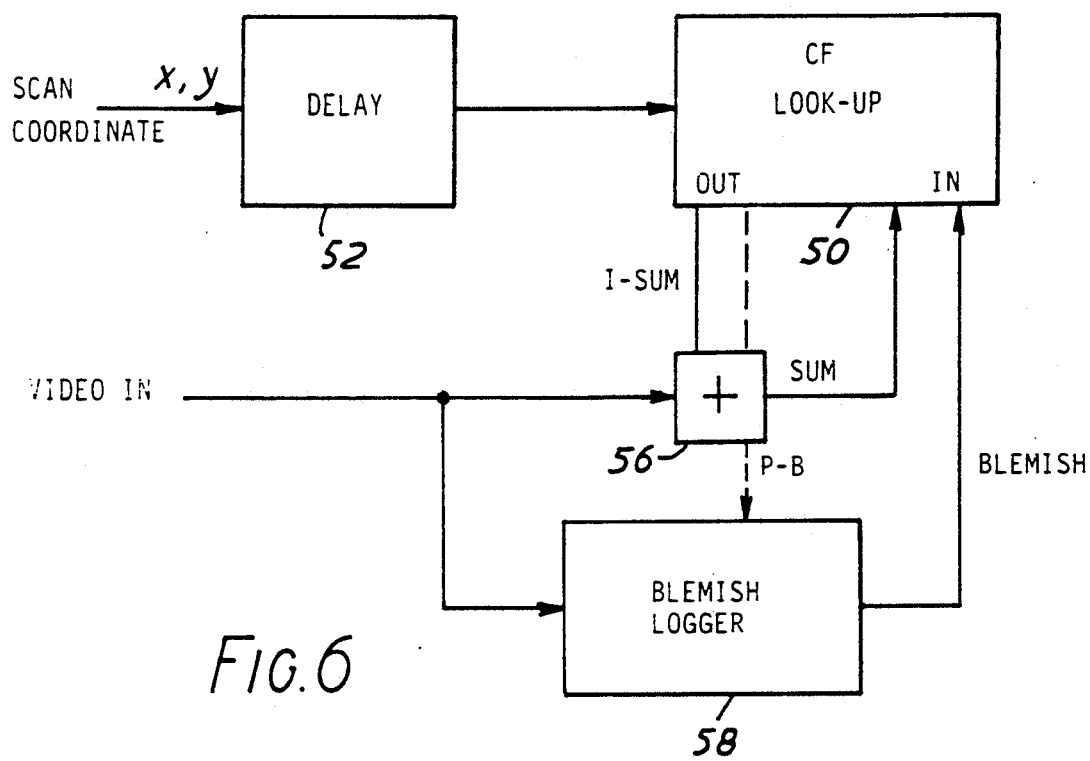
FIG. 6-is a block diagram showing the sampling phase of the alignment process

FIG. 6 shows a block diagram of the video sampling circuitry. The circuit again is individual to one of the R,G,B signals. Alternatively individual circuits could be provided for Y and colour difference signals. The delay 52 and look-up memory 50 are the same as that of FIG. 5.

When the input video is being sampled, the look-up table is used as a temporary storage area for intermediate data values and blemish values. The table is operated in a read-modify-write mode. The incoming video data value for each pixel is added to the intermediate sum for that pixel, I-SUM, in adder 56. The resultant sum output of adder 56 SUM is written back in the look-up table at the same location. This process is performed 64 times for each pixel location. However, on the first pass, I-SUM is necessarily forced to zero.

The operation may be expressed mathematically as follows:
First Pass: SUM=O+VIN (1)
where VIN (1)=VIDEO IN (Pass 1) etc
Subsequent Passes: SUM=I-SUM+VIN (n)
where I SUM=VIN (n−1)+VIN (n−2)+. . . +VIN (1)
until SUM=I SUM+VIN (64)
then SUM=VIN (av)×64

A blemish logger 58 is connected in parallel with the adder 56 and logs each input value against the single-sample blemish threshold ie. the second blemish criteria mentioned previously. If the sample is less than the threshold value a BLEMISH signal is outputted from the blemish logger 58 and stored at the current memory location in look-up table 50 with the current sum. Similarly to the sum calculation, the output from the look-up table as the first pass is forced to zero so that existing values are ignored.

On subsequent passes the stored condition (if any) of BLEMISH is read back to the blemish logger as a signal PB (Previous Blemish). If PB is set, BLEMISH is re-asserted regardless of VIN. This function is necessary because a blemish signal must be asserted if there is a blemish anywhere in the particular pixel. As the individual passes measure VIN at different points in the pixel, not all passes will pick up a blemish. Thus, a single blemish occurrence is effectively latched in for all the remaining passes in the averaging sequence.

Figure 7:
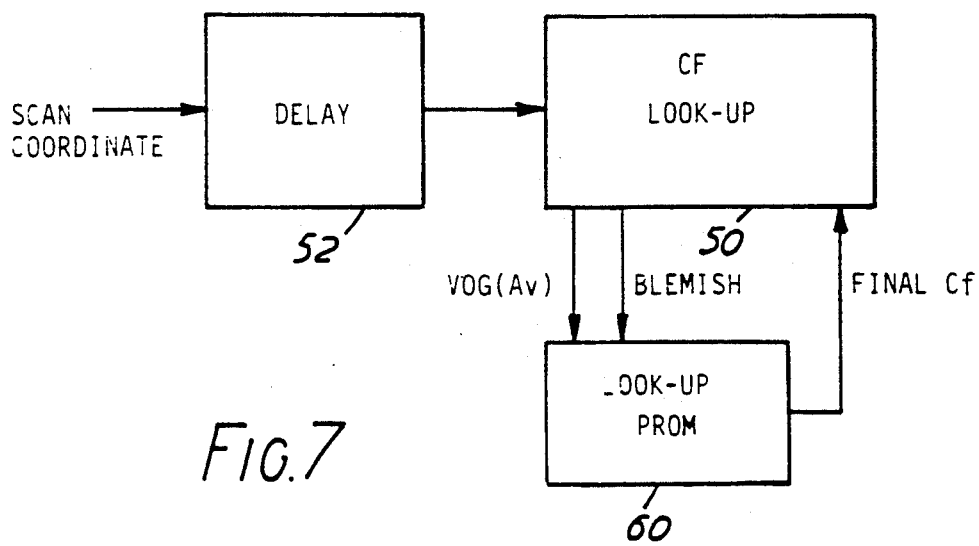
FIG. 7-shows the use of a further look-up memory during an alignment process.

FIG. 7 shows how the look-up table is loaded once the sampling process has been completed. The look-up table is loaded with CF values taken from a programmable read only memory PROM 60 which is itself coded as a look-up table. Data is output as VOG (av) and BLEMISH signals. The average open gate video level VOG (av) is derived from the stored sum of sixty four values by truncating the five least significant bits of the sum, which is equivalent to a divide by sixty four operation. This value is used to address the PROM 60, together with the final indication from BLEMISH (either a positive "blemish detected" as a negative "no blemish detected" signal). The appropriate correction factor is then stored in the main look-up table.

Figure 8:
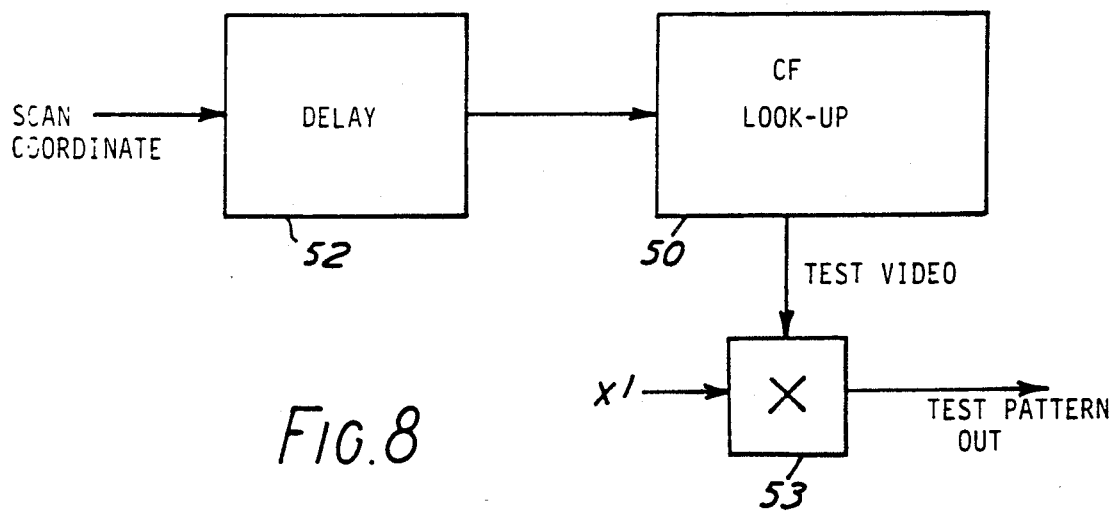
FIG. 8-shows circuitry for generation of a test pattern.

FIG. 8 shows how the look-up table 50 may be used to provide a system testing facility.

Instead of (or in some cases as well as) loading the look-up memory 50 with correction data the correction factor table is directly loaded with data forming a video test pattern. Input of this data may be controlled by the system microprocessor (not shown). The test pattern may be supplied from a store or be produced according to an algorithm directly from the microprocessor.

With the look-up memory so loaded, the output video signals are read from the look-up area in response to a scan coordinate, rather than derived from the video input, which for most purposes is ignored. The test facility operates in two modes —low resolution pattern and high resolution pattern.

In the low resolution mode, horizontal pattern changes are restricted to every fourth pixel. There is no need to repeat the full alignment process at the end of the test run before resuming normal operation as the correction factors CF need not be removed from the look-up memory 50. In the low resolution mode only part of the table area is used and all the normal contents are preserved. In the high resolution mode horizontal pattern changes occur in every successive pixel. The amount of look-up area required is such that all stored CF data is destroyed and the entire alignment process must be re-run before normal operation can be undertaken again.

Thus, in FIG. 7, the multiplier 53 (illustrated in FIG. 5) is loaded with a constant ×1 input and the output from the look-up table (the test pattern). The output of the multiplier is therefore the test pattern multiplied by unity.

Figure 9:
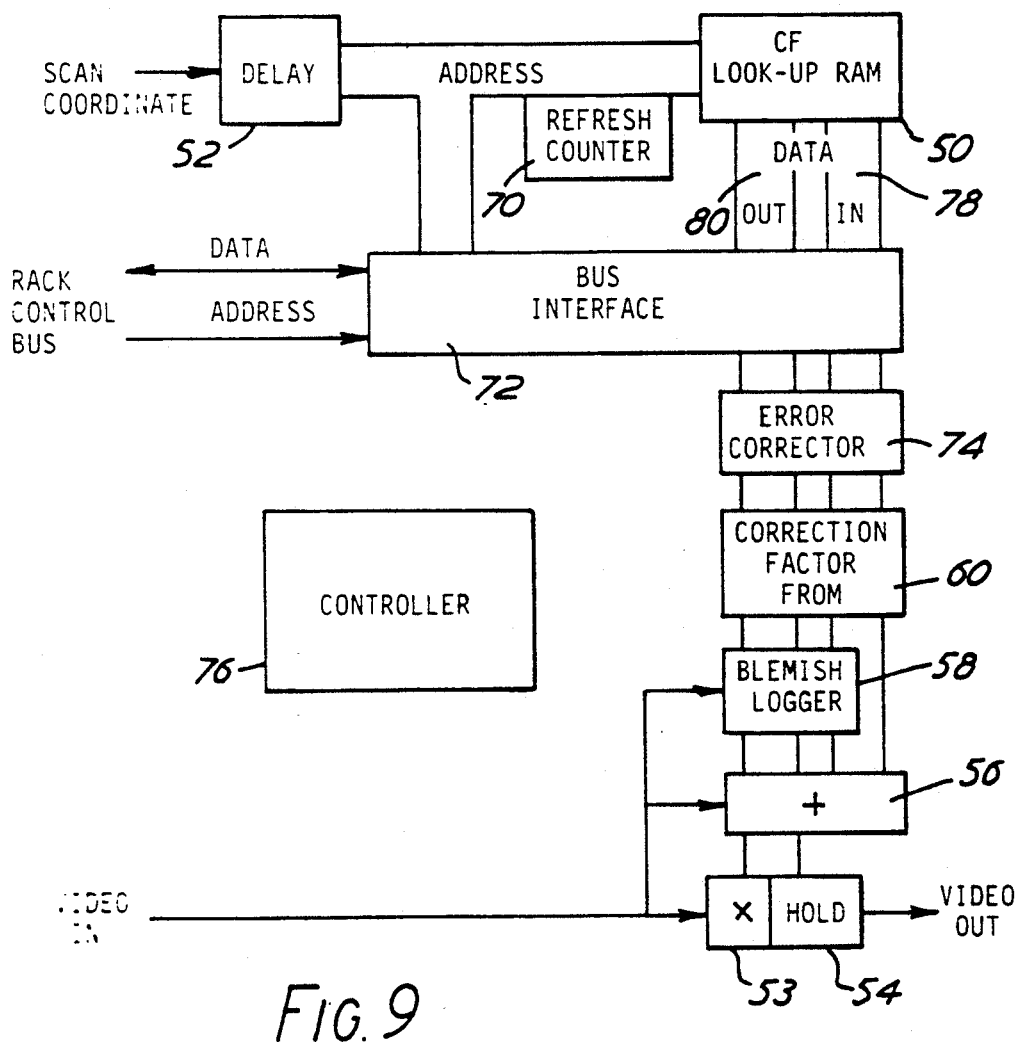
FIG. 9-is a composite block circuit diagram showing how all the functions of FIGS. 5 to 8 may be realised.

In practice, the components illustrated in, and described separately with respect to FIGS. 5 to 8 are combined on a single processing board, there being one such board for each colour signal R, G and B. The overall configuration is illustrated in FIG. 9. No further description of the previously mentioned components is necessary. However, it will be noted that refresh counter 70, bus interface 72 and error corrector 74 have not been described. The refresh counter and error corrector are necessary purely to maintain the integrity of the data stored in the CF memory, which in this embodiment is implemented in dynamic RAM.

Communication with the rack control bus is handled by the bus interface block, which allows data transfers to/from the memory area and the operating registers of the system controller 76. The latter, shown in isolation in FIG. 9 for convenience is primarily concerned with the correct sequencing of data into and out of the CF memory during operation.

It will be noted from FIG. 9 that common data buses 78 and 80 are used for data in, data out communication between the look-up memory 50 and the interface 72, error corrector 74, correction PROM 60, blemish logger 58, adder 56 and multiplier 53.

Figure 10:
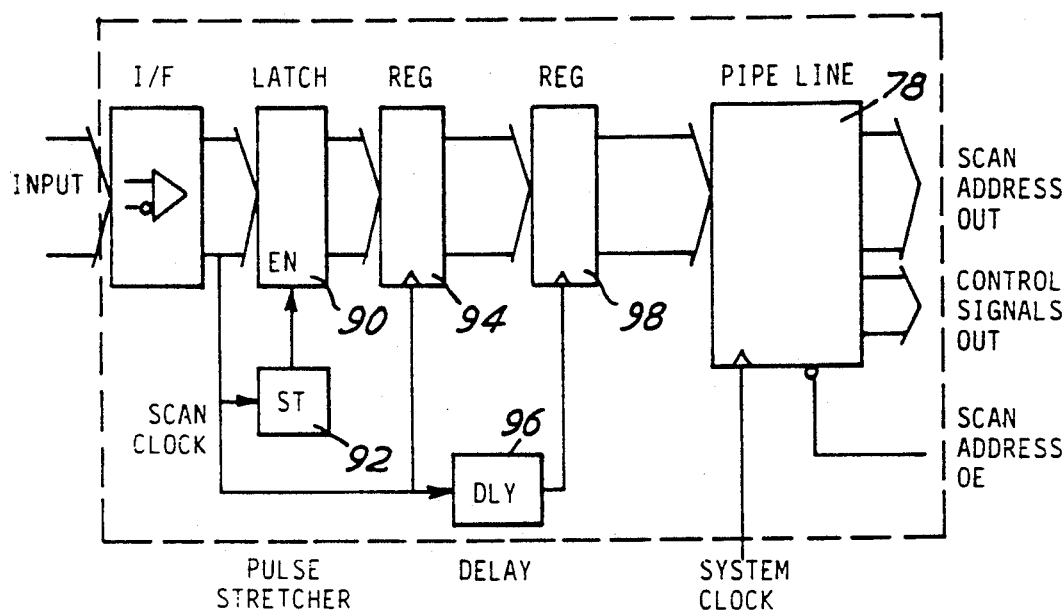
FIG. 10-is a more detailed block diagram of the delay unit of FIGS. 5 to 9.

The scan coordinate data has been shown passing through a delay 50 in FIGS. 5 to 9. This block, otherwise referred to as the scan interface, is actually rather more complicated than a simple delay line and is shown in schematic form in FIG. 10.

The input signal comprising a 20-bit coordinate and associated clock and blanking signals, are as follows:

SCAN CLK (81) Continuous, pixel-rate (18.375 MHz for 625 line, 18.3776 MHz for 525-line), scan coordinate clock signal. Nominally square in form.

LINE BLANKING (82) Continouous line-blanking waveform, maintained regardless of field timing. Also referred to as "LB".

BLANK (84) Composite, line-and-field, video blanking.

FIELD START (88) A single pulse during LB to indicate the start of a video field. Also referred to as "FS".

Figure 11:
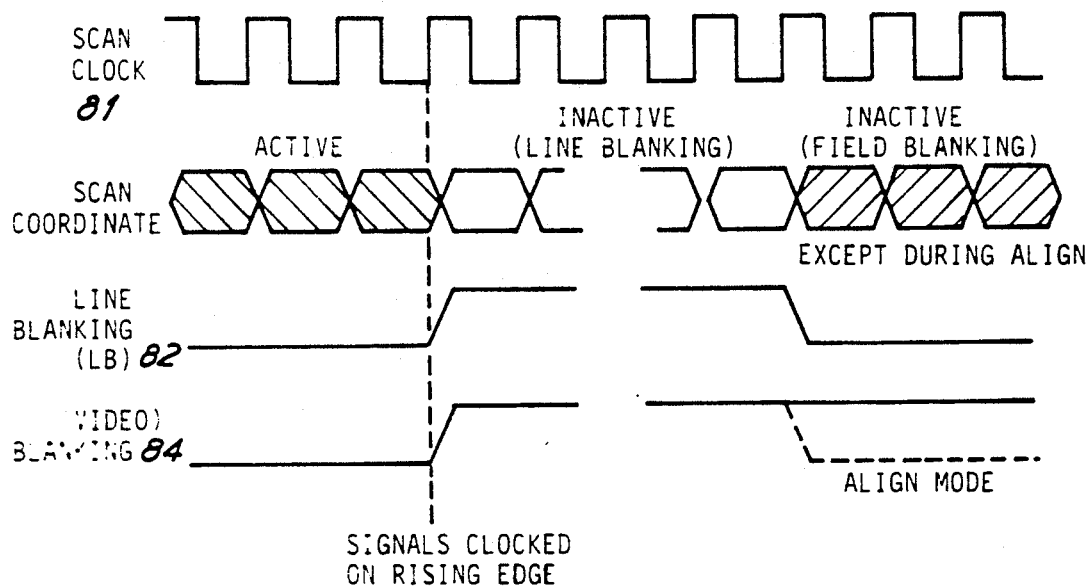
FIGS. 11 and 12-shows timing waveforms during actual scanning and alignment respectively.

The first signals are shown in diagramatic form in FIG. 11 together with the scan coordinate data stream. It should be noted that the line blanking signal LB is active during field blanking to maintain the memory refresh processes of the shading unit. Actual blanking of the video output from the shading board is achieved using the composite signal BLANK.

Figure 12:
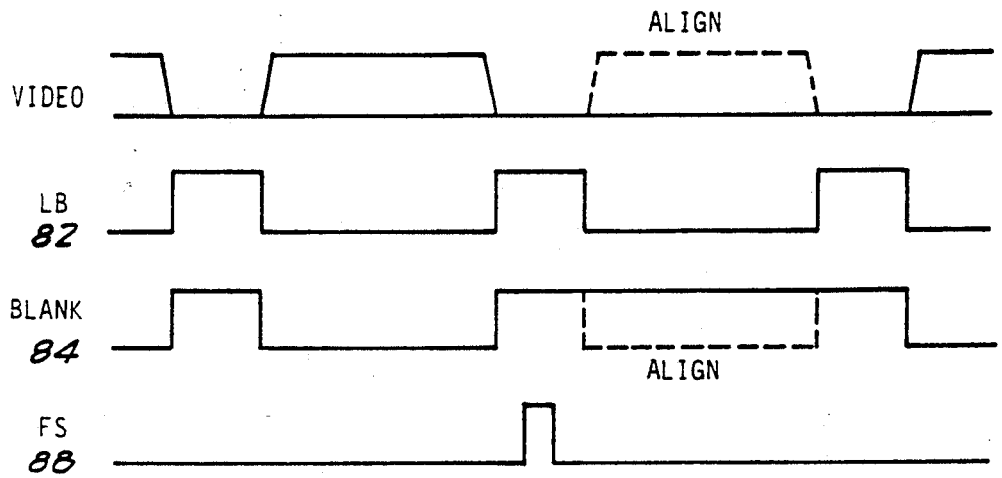

During the alignment process previously described, the scan pattern is compressed such that the field blanking period is the same length as the line blanking period. In this case, LB and BLANK are identical. This is shown in FIG. 12 which also shows the positioning of the field-start pulse 88.

All the scan signals are received in ECL differential form from another rack. They are converted to conventional, single-ended TTL format and then de-skewed with respect to SCAN CLOCK by a series combination of a transparent latch 90, driven from a pulse stretcher 92 and an edge-clocked register 94. This gives a clean stream of synchronous data.

Unfortunately, because these signals originate from another rack, there is no guaranteed phase relationship between SCAN CLOCK and the SYSTEM CLOCK used throughout the shading unit. Changing of data synchronisation from one clock to the other is done via an intermediate register 98 driven from a delayed form of SCAN CLOCK. The delay shown as block 96 is (at least initially), arranged to be adjustable, so that any degree of phase offset can be accommodated.

A variable-depth pipeline stage 78 driven by the system clock splits the scan signals into two groups and outputs them to the rest of the circuit. The full coordinate address is fed via tri-stateable outputs to the main address bus connecting to the memory block. A second, permanent, output routes the blanking signals and the four least-significant bits of the (horizontal) coordinate address to the shading controller two cycles in advance of the main address output. This is to allow the controller time to process the information before the associated coordinate appears as an address at the input of the memory.

The overall depth of the pipeline is set, in conjunction with a similar pipeline in the scan controller, to cancel out the propogation delays of the scanning path as mentioned previously achieved by keeping the address input to the memory sufficiently ahead of the video data stream so that, the CF read from memory reaches the video multiplier, at the same time as the data to which it applies.

It has been realised that one of the factors that affect burn is fast edges on CRT waveforms as they produce sharp burn edges. In order to assist the shading corrector, burn damage can be reduced by utilising slow edges in the CRT blanking waveforms to spread the burn edges, or by accelerating the scan waveform at the blanking edge times. The spot could be defocused at the blanking edge times to reduce intensity. However, care must be taken to avoid extra burning within the unblanked area near to the blanking edges. The signals shown in FIGS. 11 and 12 are purely schematic. In practice, the edges of the blanking waveforms are spread over several clock cycles. A combination of these techniques may be used.

The look-up memory has until now been considered as a block memory 50. It was mentioned with respect to FIG. 9 that the memory was implemented by dynamic RAM with the appropriate refresh and error correcting circuiting. The memory will now be described in greater detail with reference to FIGS. 13 to 15.

The design of the correction factor memory is a function of three basic parameters; the amount of storage required, the data width, and the memory cycle time. The minimum amount of storage is, of course, one location per map entry, conveniently giving full utilisation of a 1M deep RAM area which corresponds to the shading map resolution.

Data width is determined by the range of correction factors to be used, and the bit-resolution to be maintained. Correcting open gate intensities as low as 30% of maximum requires a CF range from 1.00 to 3.33. Normalising the video input to 1, a 16-bit correction factor is necessary to preserve information from all bits of the video input. This allows an actual range extending to 3.99 (4 less one LSB), which is that used when a blemish is located. The memory area is accordingly configured to provide a data width of sixteen bits, plus an additional (17th) bit for parity.

No separate provision is made for the storage of blemish data. Instead, blemish indication is coded into the correction factor. The restricted range of CF means that the two most-significant bits will never be 00 for a valid correction factor (none are less than 1). These two bits can be used as a means of blemish coding. If a location is judged to be blemished, the sequence of bits in the correction factor is altered to move the two MSBs to the LS end, and the first two bits at the MS end are set to 00. Thus, when operating normally, any CF read as 00 . . . is ignored and blemish action initiated. If blemish processing is turned off, the CF can be reconstructed by reversing the MS and LS bit pairs, although two bits of resolution are lost in this case.

A wider memory area is needed for temporary data storage during alignment. In particular, summing sixty-four 14-bit video levels during the sampling process needs a 20 bit data width to preserve information from the LSBs. Since this extra width is only needed during the relatively short alignment period, it is provided by temporary re-arrangement of the normal 16-bit memory, rather than expanding the whole area to 20 bits.

The major difficulty in this area is the rate at which data has to be read from the memory. To keep up with a stream of video data having a sample rate of 18.375 MHz it is necessary to read a new CF every 54 ns. Additionally, the unpredictable scanning sequences used in effects generation means that access to the CF store has to be truly random. Each CF must therefore be read in an individual, discrete, access cycle. This in turn dictates that the effective access time of the memory area must be somewhat less than 54 ns, allowing for propogation delays, etc.

Achieving this order of performance in a simple, single-block memory is only possible using high-speed static RAMs. Unfortunately, these are prohibitively expensive in the quantities needed here. We have appreciated that the problem may be overcome by using duplicated areas of slower memory and accessing them on different timing phases to achieve the desired overall data rate. Such a configuration is in FIG. 13.

Figure 13:
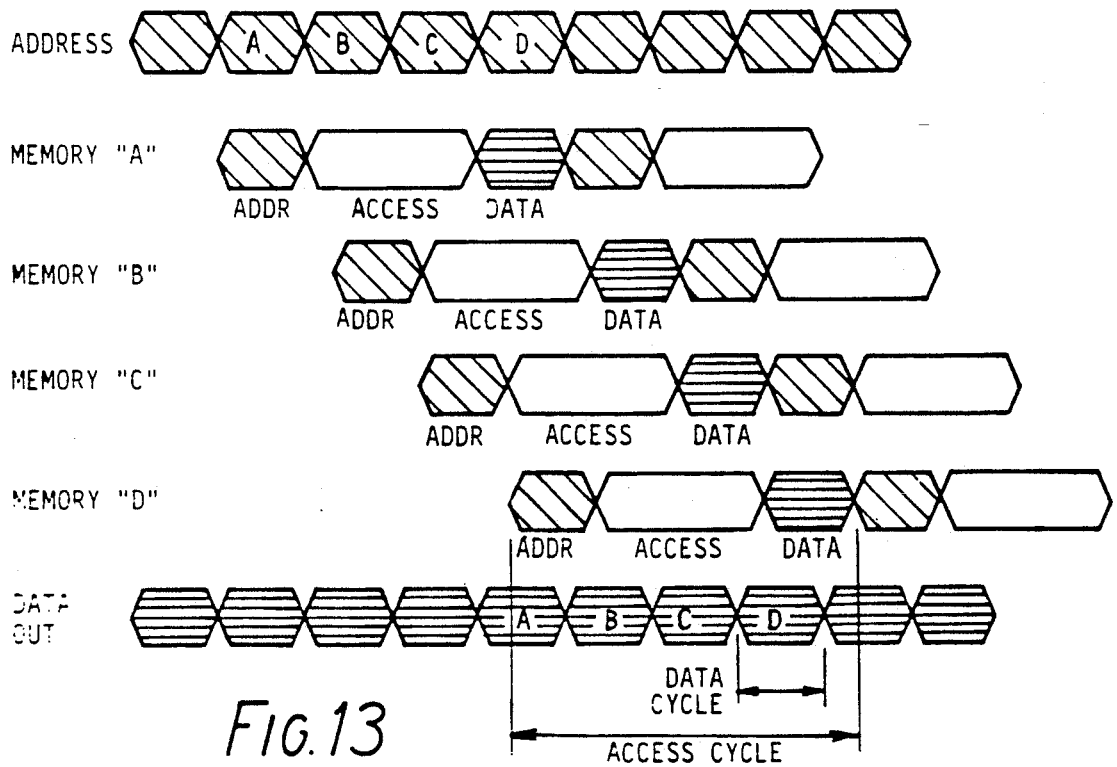
FIG. 13 - shows schematically the configuration and accessing of the correction factor memory.

FIG. 13 shows the basic idea using a four-plane memory arrangement memories A, B, C, D. Incoming data requests (addresses) are directed, in a repeating A-B-C-D sequence, to different memory planes. The output data is similarly drawn from each plane in turn, after allowing a period for data access. Individual memory planes are now addressed at only one-quarter of the request rate, i.e. the available ACCESS CYCLE is now four-times the DATA CYCLE.

Even in such an arrangement of low-speed devices, static RAMs are unsatisfactory on grounds of cost and/or packing density. (Low-speed, static RAM is only cheap in low-density, large-package form). Dynamic RAM is substantially cheaper but suffers from the problem that its random access cycle time is typically three times the usually quoted "address" access time. As previously mentioned the present system relies on a completely random address sequence due to the uncertain and changing relationship between scan waveform position and shading map. However, we have found that there are 80 ns devices that will provide the desired performance in the proposed four-plane system.

Figure 14:
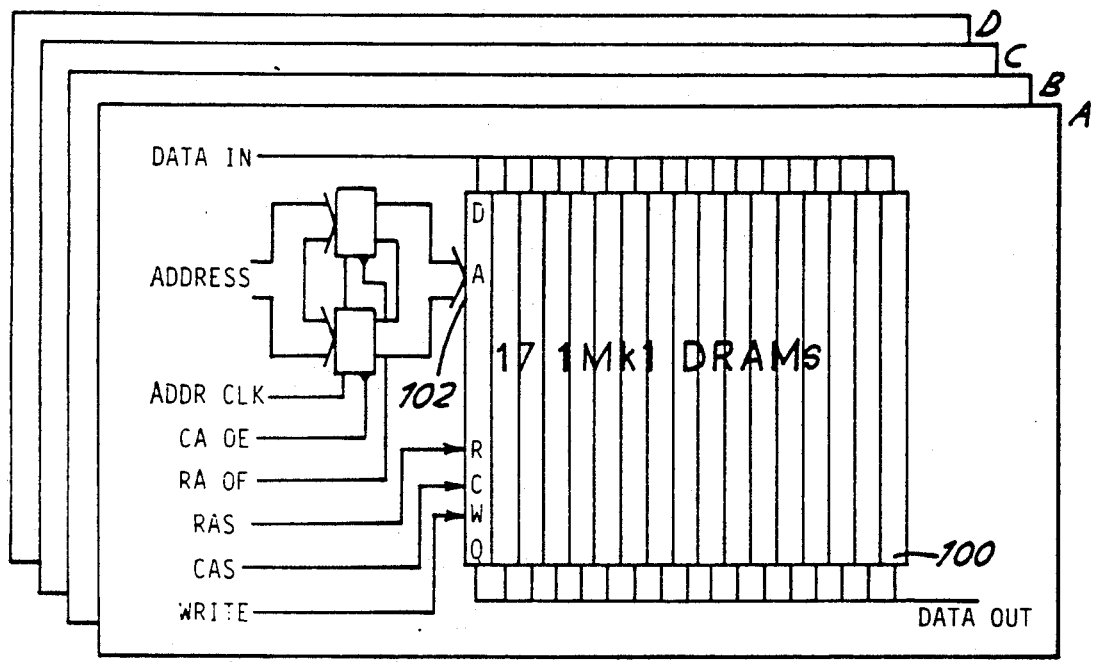
FIG. 14 - shows the memory structure of one of three boards of memory.

FIG. 14 shows for one colour only the arrangement of the memory in four parallel planes A, B, C and D. Each plane is identical and comprises seventeen 1M × 1 DRAMs 100, with latched address inputs 102. In all, three identical boards are provided, one for each component of the video signal. Dynamic RAMs are addressed as a square, row-column matrix, with the row and column addresses separately input on one set of address pins. This allows a substantial reduction in pin count, and hence package size. (Here, only 10 address pins are required to input a 20-bit address). However, an external multiplexing arrangement is needed when operating from a full-width address bus. In this case, the address multiplexing function is provided by the address latches, which are split into two parts with separate output-enables (OE).

All four planes are connected to a single address bus, while all other signals are unique to each plane. There are then, four address clocks, four RAS signals, etc., etc. Data cycles are routed via different memory planes by appropriate sequencing of the various control signals.

Figure 15:
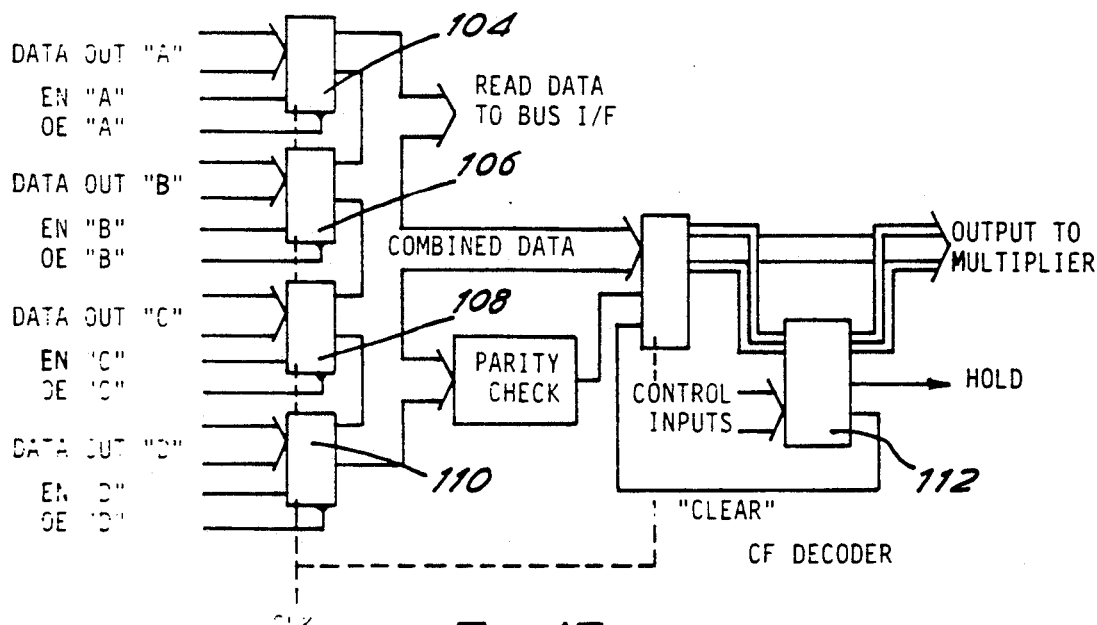
FIG. 15 - shows the output stage of one memory board of FIG. 14.

Data from the individual memory planes is combined into a continuous stream of CFs by an arrangement of latches 104–110 shown in FIG. 15. Each latch is enabled (EN) in sequence to accept data from its own memory plane, and then turned on to drive the combined bus, normally for one data cycle only. (This timing restriction does not apply when performing slow-time reads via the bus interface). The CF data is checked for valid parity before being clocked through another latch. In the event of a parity error, the latch is disabled, causing the preceding (valid) CF to be re-used.

This error handling mechanism is only used on-the-run and faults are not flagged to the main error corrector, which functions autonomously and will detect and process any errors for itself.

The output of the latch 104–110 is fed directly to one input of the video multiplier 32 (FIG. 2) with the exception of the LS and MS bit-pairs which are taken through a decoding circuit 112 first. This implements the blemish processing function, if it is being used,-outputting a hold signal to the multiplier when a blemish code is detected (corresponding to block 54, in FIG. 5). It also provides forced "times 1" and "times 0" functions, as well as video blanking, by direct driving its output lines to the appropriate conditions, while at the same time forcing the latch outputs to zero.

A feature of dynamic RAMs is that they are susceptible to soft errors caused by the impact of alpha particles. Quoted error rates are typically in the order of 0.01% per thousand hours, although modern devices could well achieve better than this. (Error rate data is not readily available). This error rate looks fairly insignificant until it is considered in context.

The working area of each memory plane (ignoring parity), is 1M × 16, or 16,777,216 bits. Together, the four planes total 67,108,864 bits. When applied to this many bits, 0.01% per thousand hours is equivalent to one bit error occurring, somewhere in memory, on average every nine minutes. Such errors are randomly distributed and could easily occur in one of the more significant bits of the CF, causing a visible defect in the displayed image. As the equipment is usually operated for long periods of time, there is the opportunity for such errors to accumulate, giving increased image degradation.

The multi-plane architecture adopted for the memory has the advantage that it provides an easy means of correcting data errors as part of the normal dynamic memory refresh process, which is here conducted during line blanking so as not to disrupt the video image.

Instead of using a simple RAS-only refresh mechanism, cycling through the required 512 refresh addresses, refresh is achieved in the course of continually rewriting all the data stored in the memory. A read-modify-write mechanism is used, with all four planes acting in phase with each other.

Figure 16:
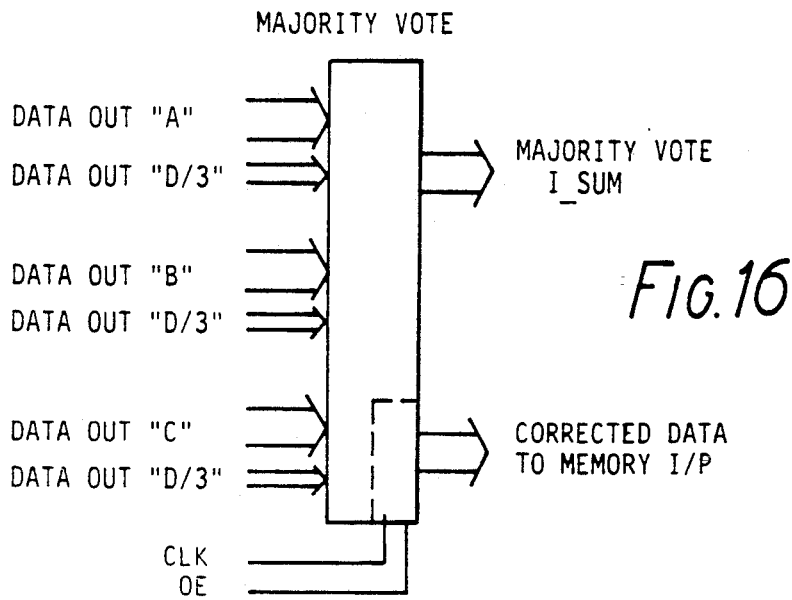
FIG. 16 - shows schematically a memory error corrector.

Corrected refresh data is generated by taking a bit-wise majority vote of the data read from planes A, B and C as shown in FIG. 16. This is then written back into all four planes. Unlike correction mechanisms for single-plane memories, there is no overhead of memory needed for additional error coding bits.

Such a process of combined refresh and error correction is referred to as error scrubbing. It is of course necessary to individually scrub every memory location. A full scrub cycle takes a lot longer than the usual 512-address refresh cycle, which is, still present as a sub-set of the scrub cycle. Restricting refresh access to the line blanking periods allows seven locations to be refreshed in each line period. At the normal line frequency of 21 kHz, refresh is achieved in 3.48 ms, and a full scrub cycle completed in 7.1 s. To avoid any possibility of errors appearing as glitches before they are scrubbed away, the parity mechanism described with reference to FIG. 15 used to temporarily nullify un-scrubbed errors by repeating the preceding un-errored, CF. Even at the minimum scanning rate, no mapped CF would be affected by corrective action from the parity circuit for more than about 11 seconds.

During alignment, it is particularly important that no errors are introduced, since a corrupted CF could subsequently give rise to a permanent pixel error in the video picture. A three plane arrangement is used, with data being written simultaneously into planes A, B and C, each being extended in width using one-third of plane D. When intermediate data is fed to the adder and blemish logger, or the correction factor generator, this is done via the error corrector,—one output of which is permanently routed to the inputs of those stages.

The system controller 76 shown in FIG. 9 retains overall control of all transfers of data into and out of the CF store 50. It also generates signals affecting the operation of the video processing stages. Although the majority of functions of the controller are not relevant to the present invention, it is desirable to consider how the controller behaves during the alignment phase.

Figure 17:
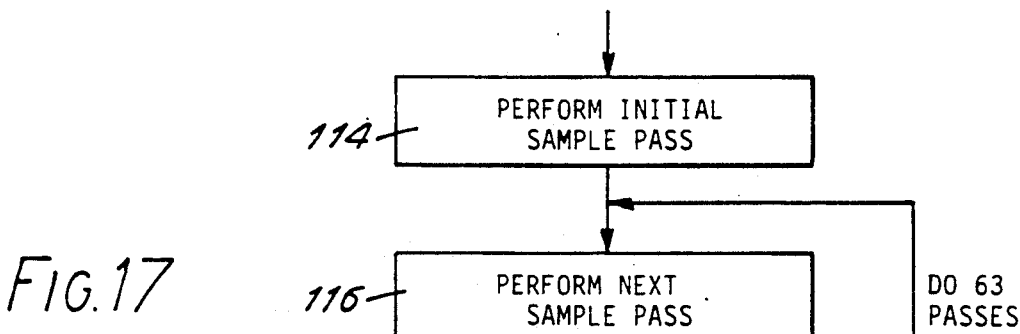
FIG. 17 - is a flow diagram of the operation of the system controller in various modes.

FIG. 17 is a flow chart showing the operation of the system controller.

The controller can operate in four modes: Run (normal operation); Bus Access (to allow the system bus access to the main memory area during periods in which video processing is suspended); Reset (entered into after power-up or a forced reset); and Alignment Mode. As can be determined from the arrows linking the individual sections of FIG. 17, mode switching is limited. In the reset mode the system can move into either the alignment (shading map derivation) or bus access modes 150, 152. From the Alignment mode 150 the controller may move to either the bus access mode 152 or the run mode 156 and from the bus access mode only the alignment and run modes may be entered. From the run mode either the alignment or bus access modes may be entered. The reset mode 154 may be entered by a 'hard' request.

In the alignment mode, a self-regulating process intensity maps the face of the CRT and produces a combined correction factor/blemish map in the CF memory 50—this is the alignment operation already described. Apart from initiation (with an open gate), the only external requirement is that the scan controller should be switched to continuously scan the full CRT area.

Figure 18:
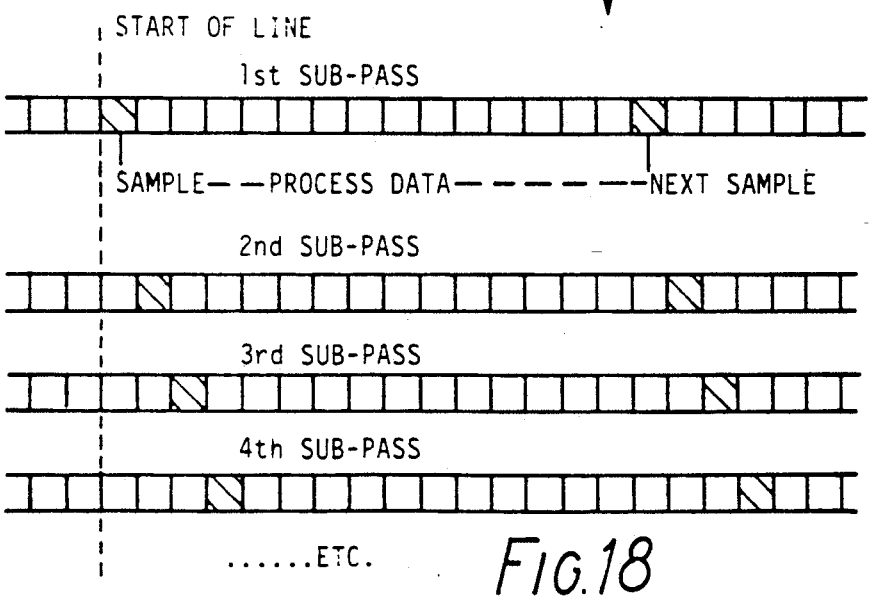
FIG. 18 - is a block diagram of the alignment mode.

FIG. 18 shows in block form the alignment sequence previously described-there are three basic functions; an initial sampling pass 114, 63 further passes where samples are summed with the existing data 116, and finally a pass 118 where the CFs are produced. The areas of the flow chart of FIG. 17 corresponding to these blocks are illustrated on that figure.

Figure 19:
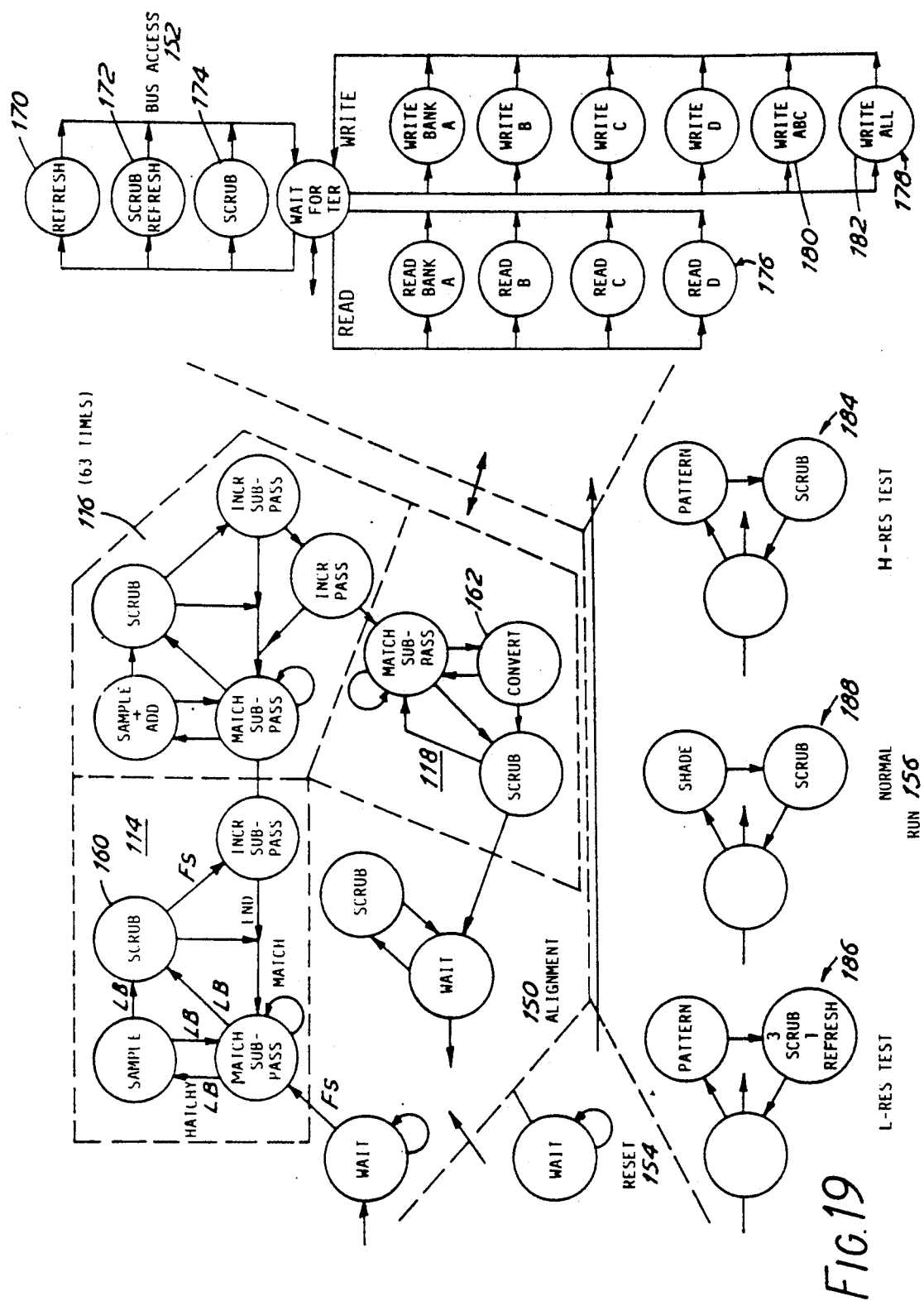
FIG. 19 - shows how each pass of the alignment operation is split into sub-passes.

Alignment is performed with the scan pattern running at full speed, i.e. a new pixel address every 54 ns. This is necessary to ensure that afterglow effects experienced are representative of those during normal operation. Scanning in slow-time would result in a shading map that is unusable since afterglow effects are dependent on scan speed. Unfortunately, the data processing for each pixel takes a lot longer than the 54 ns cycle time. The adder alone requires two cycles to produce a result, and the memory planes are being used in-parallel in read-modify-write mode which also slows the process significantly. To get round this problem, each alignment pass is performed in a series of sixteen sub-passes, with each sub-pass spread over one complete video field. Pixels are sampled on a one-in-sixteen basis, thus allowing fifteen clock cycles between consecutive samples to complete the various data transfers and additions. This process is illustrated in FIG. 19.

At this stage a comparator on the output of the sub-pass counter is used. A pixel is only sampled if the four least significant bits of its address match with the current value of the sub-pass counter, which cycles from 0 (1st sub-pass) to 15 over the sixteen fields of a pass. Thus, after all sixteen sub-passes have been completed, every pixel location in the scan pattern has been sampled once, and once only.

Referring back now to the area of FIG. 17 enclosed by the chain dotted line indicated by 114, on entering the alignment mode, no action is taken until the start-of-field signal (FS) is encountered (WAIT), whereupon the first pass is started. this delay over-rides normal memory refresh, but any data loss so caused is of no consequence since the entire RAM contents are going to be redefined anyway. The pass and sub-pass counters are set to zero, so the comparator circuit gives an address match (MATCH) every 0'th pixel. Immediately line blanking (L.B) ends, pixel sampling begins. This process is interrupted at the end of each line while a number of refresh cycles are executed during the blanking period. At step 160, SCRUB, three memory planes operate in parallel and the fourth is split between them. Corrective scrubbing is performed at this point.

No further changes take place until an FS pulse is detected during line blanking. This indicates that one complete field has been processed and the next is about to begin. The sub-pass counter is incremented so as to sample the next pixel along and the whole process is repeated. When all sixteen sub-passes have been completed, this pass is over, and control exits to the next stage of alignment (Box 116).

Flow control during the summing passes is basically the same as for the initial pass, excepting that at the end of each pass the pass counter is incremented before processing is resumed. Exit from this stage is determined by the pass counter reaching its terminal value.

The final pass 118 proceeds in similar fashion to the others. Here "convert" step 162 denotes the conversion of summed video data into a CF value. An important point to note is the change in refresh format. Now only the three parallel planes are scrubbed, the other, plane D, is refreshed without any rewriting of data. The reason for this is that during this pass, plane D usage is progressively changed from split 3-layer to normal single-plane,-as raw data is converted to CFs. If scrubbing were applied to plane D as previously, any CF values scrubbed over would be corrupted.

Once the final pass is completed the process sits in a "wait" condition until instructed to proceed elsewhere. Refreshing continues to be initiated by the line blanking signal, all four planes being scrubbed in parallel now that CF conversion is complete and the entire contents of plane D are in single-plane format.

The bus access mode 152 allows the system bus access to the main memory area and video processing is suspended in this mode. The controller waits for, and processes, read and write transfer requests, data transfers being handled in two stages via intermediate registers in the bus interface. Memory refresh continues (steps 170, 172, 174), the exact refresh operation depending on the current run mode.

Distribution of data transfers between memory planes is controlled by Bank select registers 176, 178. These registers provide separate read and write select functions. Data can be read from any one memory plane and write operations can be to a single plane, planes A, B and C (at 180) or to all planes (at 182).

The run mode 156 has three operating conditions: high resolution test 184, low resolution test 186 and normal video processing 188.

As the low resolution mode uses only one memory plane to store its test pattern the other three planes store their original data. This condition is maintained at refresh by scrubbing 3 planes and treating the one plane in isolation. Transition between the three run modes would normally be made via bus access or alignment modes.

FIGS. 20 and 21 illustrate how the blemish detection and concealment technique described with respect to FIGS. 9 may be modified.

Although the technique works satisfactorily, it has been found to have two significant drawbacks. Firstly, samples around the edge of a blemish tend to have a shading value which is higher or lower than the average shading value in that area. This difference is due to take effects which appear around the blemish and to difficulties in defining the blemish edge. The effect of the halo is that into the blemished area is substituted data which is not representative of the average shading value of the area and so the blemish is only partially concealed. Secondly, small blemishes are difficult to detect as the signal may be reduced by a small amount only. That amount may be comparable to shading and burn errors and so a small blemish may be misinterpreted.

The modified system overcomes these two disadvantages by post processing of the contents of the correction signal memory.

The memory contents are read by a microprocessor which compares successive samples. If two successive samples differ by more than a predetermined threshold value, then both the samples are flagged as blemished. The original level dependent threshold values are also maintained. Thus, where one sample is representative of the actual blemish, both it and the neighbouring sample, representative of the halo, will be flagged as blemished.

The flagged area is enlarged with respect to the earlier embodiment. This is illustrated by FIGS. 20 and 21. In FIG. 20, which shows the flagging of a blemish according to the earlier embodiment, the width of the blemish flag pulse 120 is equal to the duration for which the signal 122 falls below the blemish threshold level 124. Thus, broken lines 126 and 128 show the desired unblemished signal, correcting blemish 130 and small blemish 132. However, broken line 134 shows the only correction that is made as the value of the sample adjacent to the blemished area below the threshold value is very much lower than the unblemished value. Even if the blemish well was steeper, the adjacent sample would be inaccurate as it would represent the halo around the blemish indicated by peaks 136 and 138 in the signal either side of the blemish.

The modified blemish signal obtained by using the post processing method described is shown in FIG. 21($b$). As mentioned previously the method uses rate of change thresholds rather than shading level thresholds. This means that both the halo around the blemish and the blemish itself will be flagged as blemished as comparison of adjacent shading values will produce a difference greater than the threshold values. Moreover, the 'depth' of the blemish, that is its lowest shading value, is unimportant as the method identifies blemished areas by the slope of the walls of a blemish well. This means that smaller blemishes such as blemish 132 of FIGS. 20($a$) and 21($a$) will be corrected.

In practice the blemish flag will be two samples wider than the actual blemish. As mentioned, where two samples differ by an amount greater than the threshold value, both are flagged as blemished. This means that at the leading and trailing ends of a blemish the last unblemished sample and the first blemished sample will be flagged. Thus, the blemish flag is one sample wider at each end than the blemish. This means that the sample adjacent to the blemish flag will always be unblemished so that the corrected signal with the blemish concealed shown by broken lines 140 and 142 in FIG. 21($a$) are almost identical to the unblemished signal 126 and 128 in FIG. 20($a$).

From the discussion of FIGS. 20 and 21 it will be appreciated that the first mentioned disadvantages is avoided as the blemish area is widened. The second disadvantage may also be avoided as the comparison used effectively detects the edges of a blemish. This means that the threshold value may be set very low which enables a better discrimination to be made between blemishes and burn or shading defects.

To implement the modification, the microprocessor reads a small area of the shading memory, compares adjacent pixels in the horizontal direction and stores the location of any blemishes. A read-modify-write operation is performed on the blemished locations to add a blemish flag to the shading memory contents. Of course, adjacent pixels in the vertical direction could also be compared. However, this would require more processing twice during the alignment operation.

It should be appreciated that both the blemish detection and concealment techniques described could be used together in a telecine system.

In further modification the shading correction map may be utilised to produce a wide range of special effects. Although it is realised that these effects are in themselves known, it has until now been necessary to use specialised digital picture effects equipment to produce the effects. This modification enables the effects to be produced by shading correction circuitry and thus by a telecine machine.

In a first aspect of the modification the shading correction circuitry can be used to provide predetermined spatial variations in the brightness of the telecine picture signal. This may be achieved by loading into the shading correction memory 50 (e.g. FIG. 6) a predetermined brightness map, either instead of or in addition to the correction factors. As the output video data VIDEO OUT is the product of the input data VIDEO IN and the contents of the correction factor memory 50, the output video is a signal modulated by the brightness map. As an example the shading memory may be loaded with data representing full gain for an ellipse centred on the picture centre, and gradually reducing gain towards the edges of the picture. The effect produced will be similar to an optical vignette. It will be realised that any desired brightness effect can be produced simply by loading the correction factor memory with the desired brightness map.

In addition, parts of the picture may be masked completely by reducing the gain of those parts to zero.

The brightness maps may either be stored in look-up tables or generated by algorithms and are loaded into the correction factor memory 50 via a microprocessor.

The brightness factors, as well as being used to produce special effects, can be used to compensate for defects in the film. It is common for the sensitivity of film to vary across the width of the film and for different batches of film to exhibit different characteristics. By predetermining the response of a given batch of film a set of brightness factors can be derived which correspond to a given correction curve, for example a slope or a parabola. This curve may be derived by inserting clear film into the telecine and comparing the difference in response in this condition with the no-film film condition.

To compensate for the film condition the selected brightness factors are multiplied with the stored correction factors to give an overall compensation factor for each pixel of the scanning map. These compensation factors are then applied to the respective pixels of video data as previously described.

It will be appreciated that coloured effects may also be produced as there are three separate sets of correction factors generated in three different memories, one for each of the red, blue and green channels.

Figure 22A:
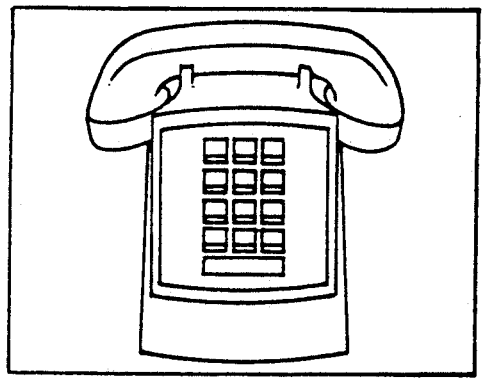
FIGS. 22(a) and (b) show an unmodified and modified image illustrating the use of colour effects.
Figure 22B:
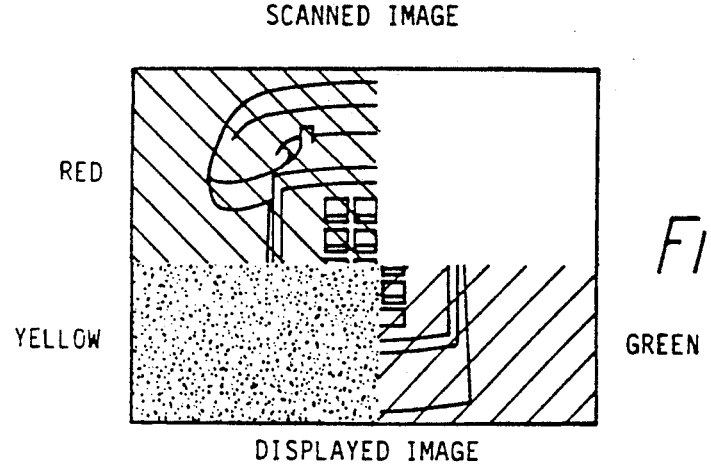
Figure 23A:
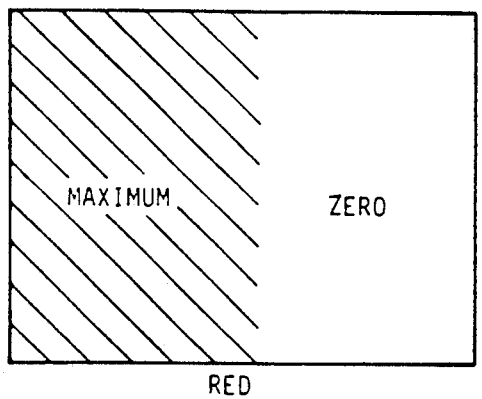
FIGS. 23a), b) and c) illustrate the derivation of the colour effects of FIG. 22(b)
Figure 23B:
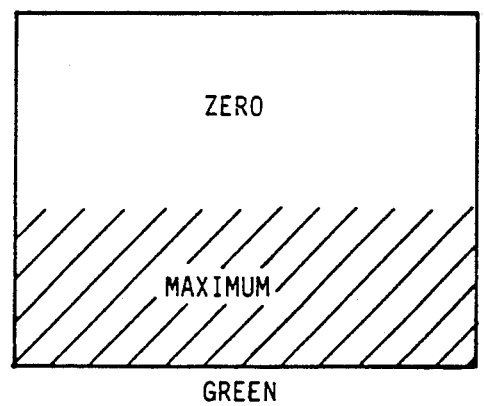
Figure 23C:
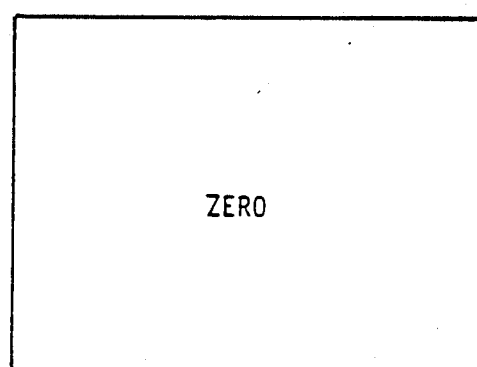

FIGS. 22 and 23 show how colour effects may be produced and also illustrate how the brightness effect just described may be produced.

FIG. 22a shows an image to be scanned, in this case a push button telephone, and FIG. 22b shows the final effect produced by colour mixing. The effect is very simple, but is for illustrative purposes only. It will be understood that much more complex effects may be produced if desired. In FIG. 22b the picture has been divided into quadrants, the top left quadrant being shaded red, the bottom left, yellow, the bottom right, green and the top right, blank.

The formation of the quadrants can be understood from the individual R, G, B shading maps shown in FIGS. 23a, b and c.

FIG. 23(a) shows the shading map for the Red signal. The processor loads the correction map for the R signal such that the left side of the image has maximum output and the right side has zero output. Similarly in FIG. 23(b) the correction factor map is loaded such that the bottom half of the map is maximum green output and the top half zero output. The correction factor map for the blue signal is loaded with zeros for all memory locations which inhibits the blue signal.

The three shading maps are superimposed to give the colour tinted displayed image of FIG. 22(b). In the bottom left quadrant the red and green halves overlap to produce a yellow quadrant. In the top right quadrant the correction factor maps are loaded with zeros for all three cases so that the top right hand quadrant of the displayed image is blank.

It will be appreciated that the brightness effect described previously can be produced by loading a brightness map into memories of each of the R G B boards. Thus for example if the pattern of FIG. 23(a) was loaded into all three correction factor memories the resulting image would be at maximum brightness on the left hand side of the image and at minimum brightness on the right hand side of the image.

The brightness modulated picture is, of course, uncorrected. To retain the function of the shading corrector the correction factor must be read from each location, the value at that location modified accordingly, and the correction factor returned to the memory location.

It will be appreciated that the brightness effects will take a significant amount of processing time to produce and remove.

To compensate for this, additional shading memories 50 may be included which can be loaded slowly and switched into operation when required.

In a second aspect of the modification a film image may be modulated or mixed with another image. It will be remembered that the correction factors in the method as initially described were derived with the telecine in an open-gate (no-film) condition. To mix images the picture to be mixed is introduced into the telecine film gate during shading alignment. The effect of this is that the correction factors derived and stored in memory 50 are the product of the shading correction factors and the inverse of the picture in the film gate.

Alternatively, pictures may be mixed by altering the shading correction routine so that the existing correction factors for each location are first read from memory 50, multiplied by the picture image at that location and the product returned to the shading memory 50. Thus, a stored picture image and correction factor results so that it is this product which modulates the subsequent film images scanned by the telecine rather than the correction factors alone.

A third method of loading pictures into the shading memory would be to transfer directly to the memory data from a digital picture store or other picture source. This data may be modified using the existing stored correction factors.

Once a picture or effect has been stored in the shading memory 50 using any of the aspects of the modification described, it may be altered or edited by interactive control from a graphics tablet or other suitable apparatus using a microprocessor control system.

Although parts of the picture may be masked or blanked by reducing the gain to zero for that area is mentioned previously, a different method is preferred for convenience. This method involves altering the blanking signal reference points such that the video signal is switched off for the areas which it is desired to blank.

Figure 24A:
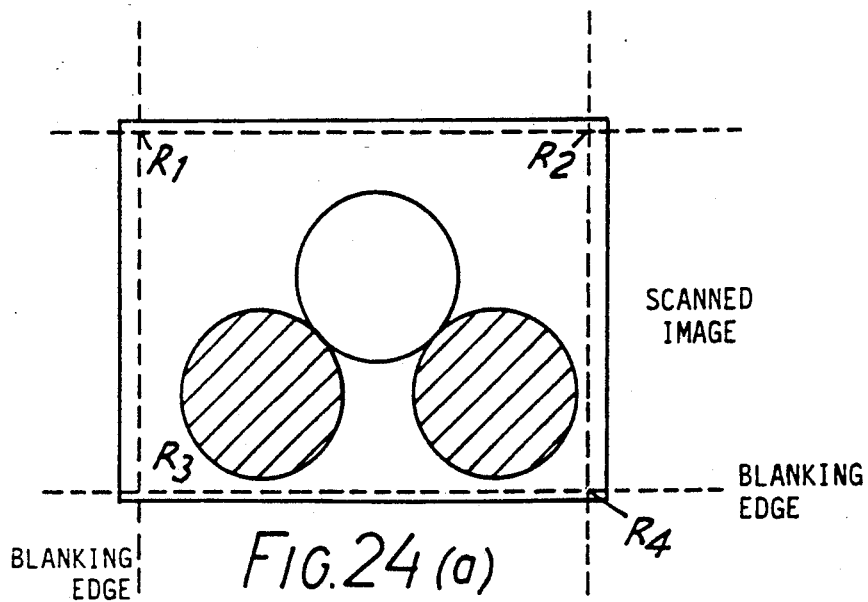
FIGS. 24a), b) and c) illustrate blanking edge effects.

FIG. 24 shows a further effect that may be generated. The scan generation circuitry produces a digital address for all horizontal and vertical scan positions. These addresses are compared with four reference number pairs, R1, R2, R3, R4 (FIG. 24a) by a blanking signal generator. The reference numbers correspond to the top left, right and bottom left, right positions of the picture. Whenever the picture exceeds these limits a blanking signal is produced which is applied to the video amplifiers to turn off the video signal. Effects are then applied to the blanking signal by modifying the reference numbers. For example, adding an offset to the left reference number moves the blanking edge to the left or the right depending on the sense of the offset. Adding a part of the vertical address to the left reference number will slope the left edge to one side. Curved or irregular effects can be applied to the blanking edges by modifying the data applied to the reference numbers using look-up tables.

Figure 24B:
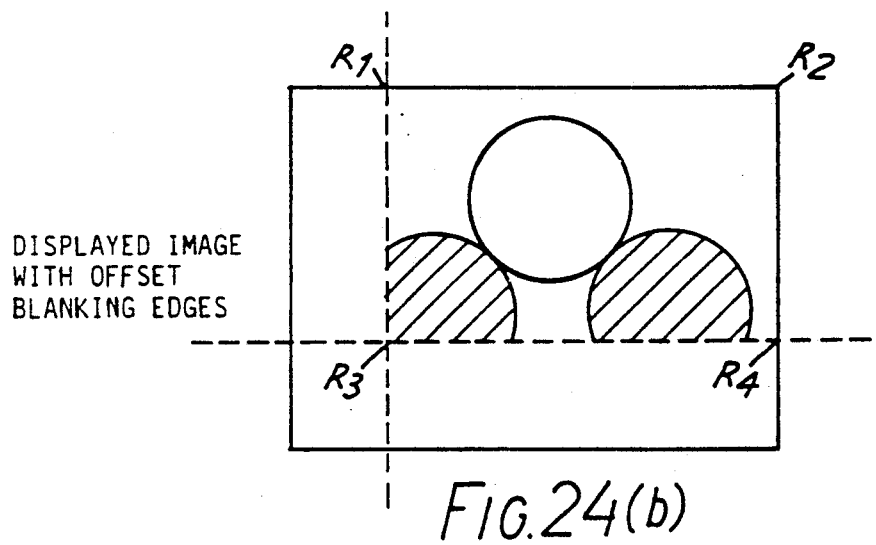

Thus, in FIG. 24(b), the left blanking edge is offset by increasing the horizontal reference numbers so that $R_1$ and $R_3$ are moved to the right of their FIG. 24(a) position. The vertical numbers of $R_3$ and $R_4$ are increased, raising the lower blanking edge. The result is that the image is displayed with offset blanking edges as shown in FIG. 24(b), with the left most and bottom most portion of the image being suppressed.

Figure 24C:
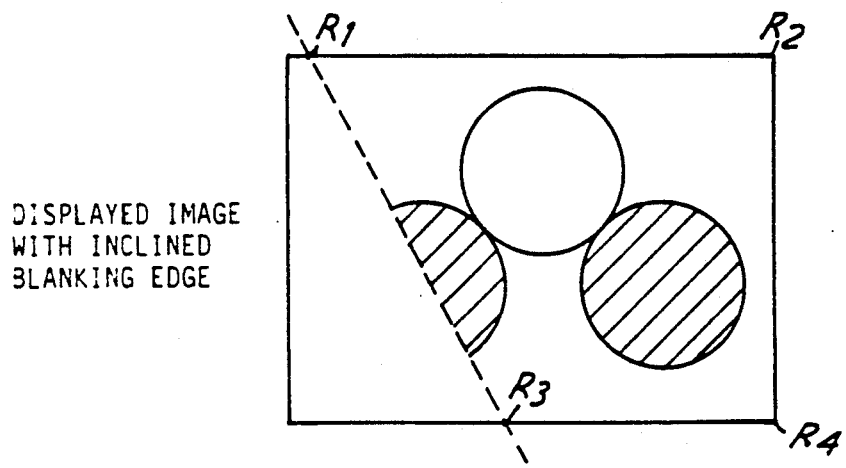

FIG. 24(c) shows the effect of adding a part of the vertical address to the left reference number. This causes the left blanking edge to slope to one side. In FIG. 24(c) the left blanking reference number has been increased also, causing $R_1$ to shift slightly to the right.

It should be understood that any of the effects outlined above can be programmed by a suitable telecine pre-programmer.

Although the description has been given in relation to a flying spot telecine, it should be appreciated that the invention in all its aspects is applicable to the situation where the telecine is used as a film writer. That is, where unexposed film is introduced in to the film gate and the video signal is split into three separate components; R,G,B each of which, in turn, is used to modulate the flying spot to write the film.

We claim:

1. A cathode ray tube (CRT) flying spot image scanning apparatus, comprising:
    a scanning area for scanning with a flying spot;
    means for addressing each location of the scanning area;
    means for deriving a correction pixel map addressable by coordinates generated by the addressing means;
    means for weighting an output video signal to compensate for defects and losses along the optical path of the apparatus, the weighting means comprising means for dividing the scanning area into a plurality of sub-areas for corresponding to a pixel of the correction pixel map;
    means for determining a correction factor for each subarea of the scanning area indicative of defects and losses associated with that area;
    storage means for holding derived correction factors;
    means for applying the correction factors to output video data from the apparatus to produce a weighted video signal;
    the addressing means including a digital scan generator and a scanning pixel map derived from the digital scan generator, the orientation of the image scanning performed by the flying spot and correction pixel map with respect to one another being variable; and
    means for applying the correction factor derived for a given pixel to a pixel of the picture scan whose centre falls within that correction map pixel.

2. Apparatus according to claim 1, comprising means for comparing the correction factors of adjacent pixels, means for marking as blemished any pair of pixels whose comparison falls outside a predetermined threshold, means for suppressing the correction factors of any pixels marked as blemished, and means for substituting for pixels corresponding to suppressed correction factors, video data derived from adjacent pixels, wherein the means for applying the correction factors to output video data operates only on unsuppressed correction factors.

3. Apparatus according to claim 1 or 2, comprising means for loading into the storage means brightness factors for each pixel of the scanning area, and means for modifying the input video signal by multiplying for each pixel, video data from an area of the scanning map corresponding to the pixel with the stored brightness factor for that pixel.

4. Apparatus according to claim 3, further comprising a plurality of stores for each video signal component and means for pre-loading into each store an individual set of brightness factors.

5. Apparatus according to claim 3, further comprising means for combining the brightness factors with the stored correction factors to provide a set of compensation factors, and means for combining the compensation factors with the video data from the corresponding areas of the scanning means.

6. Apparatus according to any of claims 1 or 2, further comprising means for loading into the storage means picture information relating to a first image in addition to the correction factors and means for modifying a second image by multiplying the stored correction factors and first image data with the second image data for each pixel of the second image.

7. Apparatus according to any of claims 1 or 2, further comprising a blemish detector for detecting pixels of the correction pixel map in which the output is lower than a predetermined threshold, and means for suppressing application of a correction factor to a given pixel on receipt of a blemish signal for that pixel.

8. Apparatus according to claim 7, in which the weighting means further comprises means for substituting for a suppressed pixel, compensated data from an adjacent pixel.

9. Apparatus according to claim 7, wherein the blemish detector includes means for detecting whether a sample in a pixel has a value lower than the said threshold value and for sending a blemish signal to the look-up table on detection of a lower value sample.

10. Apparatus according to any of claims 1 or 2, wherein the correction factor deviation means comprises sampling means for sampling each pixel of the correction map of plurality of times the samples being taken from a number of different locations within the pixel and averaging means for averaging the sum of all the samples.

11. Apparatus according to claim 10, further comprising means for generating a low resolution test signal, and means for storing data comprising the test signal corresponding to any given pixel of the correction pixel map at the same memory location as the correction factor and blemish signal for that pixel.

12. Apparatus according to claim 10, further comprising means for generating a high resolution test signal, and means for storing data comprising the test signal at the memory location of and in place of correction factors and blemish signals of the correction pixel map to which particular pixels of the test signal correspond.

13. Apparatus according to claim 10, further comprising color effect generating means including means for loading into the correction factor determining means of each color component, predetermined color data, and means for mixing the predetermined data for each component to obtain a desired color tinting of the displayed image.

14. Apparatus according to any of claims 1 or 2, wherein the storage means comprises n dynamic random access memory units, where n is at least three, each arranged to be loaded with identical data and each having an access cycle comprising an address period, an access period and a data output period, means for applying sequentially a different phase of an n phase clock memory unit, whereby during the access cycle of any memory unit data is read from a plurality of memory units, characterized by means for refreshing each of the memory units including means arranged to read the contents of at least three memory units and to write back into each memory location of all n memory units the most common data stored at that memory location in the read memory units.

15. Apparatus according to claim 14, comprising a latch associated with each memory unit, means for enabling each latch sequentially to accept data from its associated memory unit and means for switching each latch to put data onto a common output bus during the data cycle of the associated memory unit.

16. Apparatus according to claim 14, wherein n is 4 and the data cycle of memory is sequentially equal to a quarter of the access cycle of each memory unit.

17. Apparatus according to claim 14, wherein n is 4 and the data cycle of memory is sequentially equal to a quarter of the access cycle of each memory unit.

18. A method of weighting a video signal to compensate for defects and losses in a cathode ray tube (CRT) flying spot scanning apparatus having a scanning area for being scanned with the flying spot for producing the signal, the method comprising the steps of:

dividing the scanning area scanned to produce a video signal by the flying spot of the CRT into an image scanning map and a digital correction map having a plurality of uniquely addressable pixels, the correction map being derived from a digital scanning map of the CRT and being addressable by the scan coordinates of the scanning map, the orientation of the scanning map controlling the image scanning performed by the scanning apparatus, and the orientation of the scanning map and the correction map with respect to one another being variable;

deriving for each pixel of the correction map a correction factor indicative of losses and defects associated with that pixel, the correction factor applied to a given image scanning map pixel being derived from the correction map pixel which encloses the centre of that image scanning map pixel; and storing in a store the derived correction factors and applying the correction factors to said video signal during operation of the scanning apparatus to produce a compensated signal.

19. A method according to claim 18, further comprising storing brightness factors corresponding to each pixel of the correction map and modifying the input video signal by multiplying for each pixel video data from an area of the scanning map corresponding to the pixel with the stored brightness factor for that pixel.

20. A method according to claim 19, wherein the brightness factors are predetermined and loaded into a store in addition to or in place of the correction factors.

21. A method according to claim 20, wherein the brightness factors are determined to compensate for variation in film intensity and are multiplied with the correction factors to provide a set of compensation factors, and the compensation factors are applied to the video data.

22. A method according to any of claims 18 to 21, further comprising storing picture information relating to a first image together with the derived correction factor for each pixel and modifying a second image by multiplying for each pixel of the image video data from an area of the scanning map corresponding to the pixel with the stored product of the first image picture information and the correction factor for that pixel.

23. A method according to any of claims 18 to 21, further comprising comparing the stored correction factors for pairs of adjacent pixels, marking as blemished any pair of adjacent pixels the comparison of the correction factors of which falls outside a predetermined threshold value, applying the correction factors to a video signal during operation of the scanning apparatus for pixels not marked as blemished to produce the compensated signal, suppressing the correction factors for the pixels marked as blemished and substituting for those pixels, video data derived from adjacent pixels.

24. A method according to claim 23, further comprising reading an area of the correction factor store, comparing adjacent pixels in that area, storing the location of any pixels marked as blemished and adding to the store locations of blemished pixels a blemish flag.

25. A method according to claim 23, wherein the correction factors and blemish signals are loaded into a store and the video signal is corrected by multiplying for each pixel video data from an area of the scanning map corresponding to the pixel for any pixel not flagged or marked as blemished with the stored correction factor for the pixel and by substituting corrected video data from the previous pixel for any pixel flagged or marked as blemished.

26. A method according to claim 25, wherein a low resolution test pattern is loaded into the store in addition to the correction factors and blemish signals.

27. A method according to claim 25, wherein the correction factors and blemish signals are substituted by a high resolution test pattern.

28. A method according to any of claims 18 to 21, wherein the correction factors are derived by applying a uniform electron beam to the unobstructed scanning area and measuring the output from each pixel, the correction factor being proportional to the loss of intensity of the measured output from a maximum output, and wherein if the result of the comparison of the output for a given pixel is less than a predetermined threshold proportion of the maximum value, that pixel is flagged as blemished and the correction factor derived for that pixel is suppressed.

29. A method according to claim 28, wherein the video signal for an area of the scan corresponding to a pixel of the correction map flagged as blemished is compensated by substitution of the compensated signal for an adjacent unblemished pixel.

30. A method according to any of claims 18 to 21, wherein a separate set of correction factors is derived for and applied to each component of the video signal and wherein predetermined data is loaded into the correction factor memory for each color component of the video signal and the contents of the memory are applied to the video data to produce desired color effects.

31. A method according to any of claims 18 to 21, wherein the correction factor for each pixel is derived by sampling each pixel a plurality of times and averaging the sum of all the samples, each sample being taken from a different location within the pixel.

32. A method according to claim 31, wherein each sample is compared with a second predetermined threshold value, and, if any sample falls below this threshold value the pixel is flagged or marked as blemished and the correction factor derived for that pixel is suppressed.

33. A method of correcting a video signal produced by a telecine to compensate for variations in response in the film from which the video signal is to be derived, comprising deriving a set of correction factors by the method of any of claims 18 to 21, deriving a set of brightness factors corresponding to the characteristics of the film, generating a set of compensation factors by combining the brightness and correction factors and applying the compensation factors to the video data.

34. A method according to claim 33, wherein the brightness factors correspond to a pre-selected response curve across the width of the film.

35. A method according to claim 33, wherein the brightness factors are derived from the clear film inserted in the film gate after derivation of the correction factors in the open gate condition.

36. A method according to claim 35, wherein the address for each memory is provided by a common address bus.

37. A method according to any of claims 18 to 21, wherein data is read from the store by loading n dynamic random access memory units with identical data where n is at least three, each random access unit having an access cycle comprising an address period, an access period and a data output period, addressing each memory unit sequentially on a different phase of an n-phase address clock, and reading data sequentially from each memory unit, whereby during the access cycle of any one memory unit, data is read from a plurality of memory units, characterized by refreshing the memory units by reading data stored at each memory location of at least three memory units and writing into the corresponding memory location of each memory unit the most commonly occurring data at each of the read memory locations.

38. A method according to claim 37, wherein data output from each memory unit is fed into a respective latch for that memory unit, and each latch is enabled in sequence to accept data from its associated memory unit and is switched to put data onto a common output bus during the data cycle of the memory unit.

* * * * *